United States Patent
Jin et al.

(10) Patent No.: US 11,438,818 B2
(45) Date of Patent: *Sep. 6, 2022

(54) HANDOVER METHOD, BASE STATION, AND TERMINAL DEVICE

(71) Applicant: HUAWEI TECHNOLOGIES CO., LTD., Guangdong (CN)

(72) Inventors: Yinghao Jin, Shanghai (CN); Hong Li, Shanghai (CN); Jinfang Zhang, Shenzhen (CN); Wei Zhang, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 8 days.

This patent is subject to a terminal disclaimer.

(21) Appl. No.: 17/090,005

(22) Filed: Nov. 5, 2020

(65) Prior Publication Data

US 2021/0127311 A1 Apr. 29, 2021

Related U.S. Application Data

(63) Continuation of application No. 16/029,804, filed on Jul. 9, 2018, now Pat. No. 10,834,648, which is a
(Continued)

(30) Foreign Application Priority Data

Jan. 16, 2016 (CN) .......................... 201610029737.5

(51) Int. Cl.
*H04W 36/08* (2009.01)
*H04W 4/70* (2018.01)
*H04W 36/00* (2009.01)

(52) U.S. Cl.
CPC ............. *H04W 36/08* (2013.01); *H04W 4/70* (2018.02); *H04W 36/0033* (2013.01)

(58) Field of Classification Search
CPC ........... H04W 36/023; H04W 28/0263; H04W 36/0016; H04W 40/36; H04W 36/38; H04W 36/08; H04W 40/34
(Continued)

(56) References Cited

U.S. PATENT DOCUMENTS 9,319,935 B2 4/2016 Fischer
9,532,278 B2 * 12/2016 Park .................. H04W 36/0072
(Continued)

FOREIGN PATENT DOCUMENTS

CN 101047968 10/2007
CN 102238659 11/2011
(Continued)

OTHER PUBLICATIONS

EPO Communication pursuant to Article 94(3) EPC issued in European Application No. 20152573.0 dated Oct. 7, 2021, 7 pages.
(Continued)

*Primary Examiner* — Joseph Arevalo
(74) *Attorney, Agent, or Firm* — Fish & Richardson P.C.

(57) ABSTRACT

The present patent application discloses a handover method, a base station, and a terminal device. The handover method includes: sending, by a source base station, a handover request to a target base station, where the handover request includes information about a first service of a terminal device; receiving, by the source base station, a handover response sent by the target base station, where if the first service is supported by the target base station, the handover response includes information about a handover instruction for the first service, and the handover instruction is used to instruct the terminal device to hand over the first service from the source base station to the target base station; and sending, by the source base station, a handover response to the terminal device.

20 Claims, 11 Drawing Sheets

Related U.S. Application Data continuation of application No. PCT/CN2016/109519, filed on Dec. 12, 2016.

(58) Field of Classification Search
USPC .................. 455/436, 449, 425, 452.2, 552.1
See application file for complete search history.

(56) References Cited

U.S. PATENT DOCUMENTS

| | | |
|---|---|---|
| 2007/0109986 A1 | 5/2007 | Kwak et al. |
| 2009/0247148 A1 | 10/2009 | Chen et al. |
| 2010/0273487 A1 | 10/2010 | Alonso-Rubio et al. |
| 2013/0142288 A1 | 6/2013 | Dinan |
| 2013/0223205 A1* | 8/2013 | Chuang ................ H04W 48/04 370/225 |
| 2013/0286960 A1 | 10/2013 | Li et al. |
| 2013/0303114 A1 | 11/2013 | Ahmad et al. |
| 2014/0370898 A1 | 12/2014 | Saily |
| 2015/0119041 A1* | 4/2015 | Wang ................ H04W 36/0079 455/436 |
| 2016/0277986 A1 | 9/2016 | Moon et al. |
| 2016/0353465 A1 | 12/2016 | Vrzic et al. |
| 2017/0054595 A1 | 2/2017 | Zhang et al. |
| 2017/0079059 A1 | 3/2017 | Li et al. |
| 2017/0164245 A1 | 6/2017 | Chai et al. |
| 2017/0295531 A1 | 10/2017 | Singh et al. |
| 2017/0331577 A1 | 11/2017 | Parkvall et al. |
| 2017/0331670 A1 | 11/2017 | Parkvall et al. |
| 2017/0339567 A1 | 11/2017 | Li et al. |
| 2018/0124656 A1 | 5/2018 | Park et al. |
| 2018/0227837 A1 | 8/2018 | Starsinic et al. |
| 2019/0007899 A1 | 1/2019 | Vrzic et al. |
| 2019/0013920 A1 | 1/2019 | Johansson et al. |
| 2019/0028943 A1 | 1/2019 | Wang et al. |
| 2020/0100146 A1* | 3/2020 | Laitila ................ H04W 28/0263 |

FOREIGN PATENT DOCUMENTS

| | | |
|---|---|---|
| CN | 102378290 A | 3/2012 |
| CN | 102333359 | 1/2015 |
| CN | 104955115 | 9/2015 |
| EP | 2779513 A2 | 9/2014 |
| EP | 2249601 B1 | 12/2016 |
| JP | 2015527846 | 9/2015 |
| WO | 2010130135 | 11/2010 |
| WO | 2014104960 A1 | 7/2014 |
| WO | 2015031512 | 3/2015 |
| WO | 2015143888 | 10/2015 |

OTHER PUBLICATIONS

"NGMN 5G White Paper", A Deliverable by the NGMN Alliance, V1.0, Feb. 17, 2015, total 125 pages.

3GPP TR 22.891 V0.1.1 (Apr. 2015)(S1-151623); 3rd Generation Partnership Project; Technical Specification Group Services and System Aspects; Feasibility Study on New Services and Markets Technology Enablers; Stage 1 (Release 14), total 25 pages.

3GPP TS 36.300 V12.8.0 (Dec. 2015), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), total 254 pages.

XP051034143 S1-154307 Deutsche Telekom et al.,"FS_NEO System Flexibility", 3GPP TSG-SA WG1 Meeting #72, Anaheim, CA, USA, Nov. 16-20, 2015, total 6 pages.

XP051163048 R3-162462 Huawei,"Support of Network Slice Discovery", 3GPP TSG-RAN WG3 Meeting #93bis, Sophia Antipolis, France, Oct. 10-14, 2016, total 4 pages.

"ZTE Corporation,""Update the network slicing use case in SMARTER""", 3GPP TSG-SA WG1 Meeting #71 S1-152074,Belgrade, Serbia, Aug. 17-21, 2015, total 3 pages."

Office Action issued in Chinese Application No. 201610029737.5 dated Sep. 28, 2021, 4 pages.

Zhenhuan, "The Research of Inter-Rat Interoperability Technologies of TD-LTE," Beijing Jiaotong University, Issue S2, 2013, 2 pages (with English abstract).

* cited by examiner

HANDOVER METHOD, BASE STATION, AND TERMINAL DEVICE

CROSS-REFERENCE TO RELATED APPLICATIONS

This application is a continuation of U.S. application Ser. No. 16/029,804, filed on Jul. 9, 2018, which is a continuation of international Application No. PCT/CN2016/109519, filed on Dec. 12, 2016, which claims priority to Chinese Patent Application No. 201610029737.5, filed on Jan. 16, 2016. All of the afore-mentioned patent applications are hereby incorporated by reference in their entireties.

TECHNICAL FIELD

The present patent application relates to the communications field, and more specifically, to a handover method, a base station, and a terminal device.

BACKGROUND

A future wireless communications network needs to satisfy diversified service requirements such as high-definition multi-party video communication, ultra-low latency Internet of Things (Internet of Things, IoT) communication, and massive machine to machine communication (Massive Machine to Machine, Massive M2M) services. These services have immensely varied performance requirements, and a variation range of network requirements is huge. A network slicing architecture is proposed in the industry for diversified service requirements. How to ensure mobility of a terminal device in the network slicing architecture is a problem to be specially considered.

SUMMARY

The present patent application provides a handover method, a base station, and a terminal device, to adapt to a network slicing architecture.

According to a first aspect, the present patent application provides a handover method, including: sending, by a source base station, a handover request to a target base station, where the handover request includes information about a first service of a terminal device; receiving, by the source base station, a handover response sent by the target base station, where if the first service is supported by the target base station, the handover response includes information about a handover instruction for the first service, and the handover instruction is used to instruct the terminal device to hand over the first service from the source base station to the target base station; and sending, by the source base station, a handover response to the terminal device.

An existing handover request does not contain service type information. When the target base station has a resource, even if the target base station cannot provide services of some service types, the target base station should admit to server the user during admission control. However, after handover, the target base station cannot provide a service of a corresponding type. As a result, service interruption occurs. In the present patent application, a handover request contains information about a service, and the target base station also considers a service type when sending a handover response. The target base station can accurately determine whether the target base station needs to accept handover. A current service of a user is allowed admitted to the target base station, only when the target base station can support the service. In this way, a service interruption probability of the terminal device is reduced. A service interruption problem caused by mobility of the terminal device can be resolved to some extent.

With reference to the first aspect, in a first possible implementation of the first aspect, the handover request further includes information about a second service of the terminal device; and if the second service is not supported by the target base station, the handover response further includes information about an air interface resource of the second service, the air interface resource is determined by the target base station and on which interference coordination is performed, and the air interface resource is used by the source base station and the terminal device to transmit the second service.

Because of mobility, a terminal device may move from a source base station supporting all service types of the terminal device to a target base station that does not support all the service types of the terminal device. In a possible processing manner, a service of a service type that the target base station does not support is interrupted for the terminal device. However, in the present patent application, a service that the target base station does not support still resides in the source base station. The terminal device and the source base station specifically perform service transmission on some air interface resources. The target base station performs interference coordination on the air interface resources. In this way, the source base station is subject to less interference, and a service interruption problem is avoided to some extent, so that an interruption probability caused by the mobility of the terminal device is reduced.

With reference to the first possible implementation of the first aspect, in a second possible implementation of the first aspect, the handover request further includes quality of service information of the second service of the terminal device, and the air interface resource is determined by the target base station based on the quality of service information.

If the handover request contains the QoS information of the second service of the terminal device, the target base station calculates, based on the QoS information, a quantity of air interface resources needed to satisfy a QoS requirement of the terminal device, and then chooses corresponding air interface resources. In this way, air interface resources can be dynamically determined, and utilization of the air interface resources is high.

With reference to any one of the first aspect, or the first and second possible implementations of the first aspect, in a third possible implementation of the first aspect, the method further includes: obtaining, by the source base station, information about supported service of the target base station; and the sending, by a source base station, a handover request to a target base station includes: if the target base station supports the first service, sending, by the source base station, the handover request to the target base station.

Optionally, the source base station considers a service type. The source base station sends the handover request to the target base station only when the target base station supports at least some service types of the terminal device. The source base station no longer sends the handover request when the target base station supports none of services of the source base station, so that inter-system signaling interaction is reduced.

With reference to the third possible implementation of the first aspect, in a fourth possible implementation of the first aspect, the obtaining, by the source base station, information about supported service of the target base station includes:

receiving, by the source base station, a measurement report sent by the terminal device, where the measurement report includes the information about the at least one supported service of the target base station. The measurement report contains the information about the at least one supported service of the target base station, and only one information element needs to be added to existing signaling. In this way, processing is simple, and overheads are low. With reference to the fourth possible implementation of the first aspect, in a fifth possible implementation of the first aspect, the obtaining, by the source base station, information about supported service of the target base station includes: receiving, by the source base station, the information that is sent by a controller or the target base station and that is about the at least one supported service of the target base station. In this way, air interface resources can be saved.

With reference to any one of the first aspect, or the first to fifth possible implementations of the first aspect, in a sixth possible implementation of the first aspect, the sending, by a source base station, a handover request to a target base station includes: sending, by the source base station, the handover request to the target base station by using the controller; and the receiving, by the source base station, a handover response sent by the target base station includes: receiving, by the source base station by using the controller, the handover response sent by the target base station. If there is no interface between the base stations or the handover request fails to be directly sent between the base stations, the controller may also complete handover.

With reference to any one of the first aspect, or the first to fifth possible implementations of the first aspect, in a seventh possible implementation of the first aspect, the sending, by a source base station, a handover request to a target base station includes: sending, by the source base station, the handover request to the target base station by using a source gateway and a target gateway; and the receiving, by the source base station, a handover response sent by the target base station includes: receiving, by the source base station by using the source gateway and the target gateway, the handover response sent by the target base station. When the source base station and the target base station respectively belong to two different gateways, handover may still be successfully completed.

According to a second aspect, the present patent application provides a handover method, including: receiving, by a target base station, a handover request sent by a source base station, where the handover request includes information about a first service of a terminal device; sending, by the target base station a handover response to the source base station, where if the target base station supports the first service, the handover response includes information about a handover instruction for the first service, and the handover instruction is used to instruct the terminal device to hand over the first service to the target base station.

With reference to any one of the second aspect, or the foregoing possible implementations of the second aspect, in a third possible implementation of the second aspect, the target base station sends a path switch request to a gateway, where the path switch request includes the information about the first service; and the target base station receives a path switch request acknowledgement sent by the gateway.

According to a third aspect, the present patent application provides a handover method, including: sending, by a terminal device, a measurement report to a source base station; and receiving, by the terminal device, a handover response, where if a first service of the terminal device is supported by a target base station, the handover response includes information about a handover instruction for the first service, and the handover instruction is used to instruct the terminal device to hand over the first service to the target base station.

With reference to the third aspect, in a first possible implementation of the third aspect, if a second service of the terminal device is not supported by the target base station, the handover response further includes information about an air interface resource of the second service, the air interface resource is determined by the target base station and on which interference coordination is performed, and the air interface resource is used by the terminal device and the source base station to transmit the second service.

With reference to the first possible implementation of the third aspect, in a second possible implementation of the third aspect, the measurement report includes information about supported service of the target base station.

According to a fourth aspect, the present patent application provides a handover method, including: receiving, by a gateway, a path switch request sent by a target base station, where the path switch request includes information about a first service of a terminal device; and sending, by the gateway, a path switch request acknowledgement to the target base station. In this way, the gateway can clearly know which services are switched to the target base station, and the gateway directly sends downlink data of the services to the target base station, thereby ensuring normal running of a system.

According to a fifth aspect, the present patent application provides a handover method, including: receiving, by a source gateway, a handover request sent by a source base station, where the handover request includes information about a first service of a terminal device; sending, by the source gateway, the handover request to a target gateway; receiving, by the source gateway, a handover response sent by the target gateway, where if the first service is supported by a target base station, the handover response includes information about a handover instruction for the first service, and the handover instruction is used to instruct the terminal device to hand over the first service to the target base station; and sending, by the source gateway, the handover response to the source base station.

According to a sixth aspect, the present patent application provides a handover method, including: receiving, by a target gateway, a handover request sent by a source gateway, where the handover request includes information about a first service of a terminal device; sending, by the target gateway, the handover request to a target base station; receiving, by the target gateway, a handover response sent by the target base station, where if the first service is supported by the target base station, the handover response includes information about a handover instruction for the first service, and the handover instruction is used to instruct the terminal device to hand over the first service to the target base station; and sending, by the target gateway, the handover response to the source gateway.

According to a seventh aspect, the present patent application provides a handover method, including: receiving, by a controller, a handover request sent by a source base station, where the handover request includes information about a first service of a terminal device; sending, by the controller, the handover request to a target base station; receiving, by the controller, a handover response sent by the target base station, where if the first service is supported by the target base station, the handover response includes information about a handover instruction for the first service, and the handover instruction is used to instruct the terminal device to hand over the first service to the target base station; and sending, by the controller, the handover response to the source base station.

With reference to the second, fifth, sixth or seventh aspect, in a possible implementation, the handover request further includes information about a second service of the terminal device; and if the second service is not supported by the target base station, the handover response further includes information about an air interface resource of the second service, the air interface resource is determined by the target base station and on which interference coordination is performed, and the air interface resource is used by the terminal device and the source base station to transmit the second service.

Furthermore, the handover request further includes quality of service information of the second service of the terminal device, and the air interface resource is determined based on the quality of service information of the second service of the terminal device.

According to an eighth aspect, the present patent application provides a base station, including: a sending unit, configured to send a handover request to a target base station, where the handover request includes information about a first service of a terminal device; and a receiving unit, configured to receive a handover response sent by the target base station, where if the first service is supported by the target base station, the handover response includes information about a handover instruction for the first service, and the handover instruction is used to instruct the terminal device to hand over the first service from the base station to the target base station; and the sending unit is further configured to send a handover response to the terminal device.

With reference to the eighth aspect, in a first possible implementation of the eighth aspect, the handover request further includes information about a second service of the terminal device; and if the second service is not supported by the target base station, the handover response further includes information about an air interface resource of the second service, the air interface resource is determined by the target base station and on which interference coordination is performed, and the air interface resource is used by the terminal device and the base station to transmit the second service.

With reference to the first possible implementation of the eighth aspect, in a second possible implementation of the eighth aspect, the handover request further includes quality of service information of the second service of the terminal device, and the air interface resource is determined by the target base station based on the quality of service information.

With reference to the eighth aspect, or the first or second possible implementation of the eighth aspect, in a third possible implementation of the eighth aspect, the receiving unit is further configured to obtain information about supported service of the target base station; and that the sending unit is configured to send the handover request to the target base station includes: if the target base station supports the first service, the sending unit is configured to send the handover request to the target base station.

With reference to the third possible implementation of the eighth aspect, in a fourth possible implementation of the eighth aspect, that the receiving unit is further configured to obtain the information about the at least one supported service of the target base station includes: the receiving unit is further configured to receive a measurement report sent by the terminal device, where the measurement report includes the information about the at least one supported service of the target base station.

With reference to the third possible implementation of the eighth aspect, in a fifth possible implementation of the eighth aspect, that the receiving unit is further configured to obtain the information about the at least one supported service of the target base station includes: the receiving unit is further configured to receive the information that is sent by a controller or the target base station and that is about the at least one supported service of the target base station.

With reference to any one of the eighth aspect, or the first to fifth possible implementations of the eighth aspect, in a sixth possible implementation of the eighth aspect, the sending unit is specifically configured to send the handover request to the target base station by using the controller; and the receiving unit is specifically configured to receive, by using the controller, the handover response sent by the target base station.

With reference to any one of the eighth aspect, or the first to fifth possible implementations of the eighth aspect, in a seventh possible implementation of the eighth aspect, the sending unit is specifically configured to send the handover request to the target base station by using a source gateway and a target gateway; and the receiving unit is specifically configured to receive, by using the source gateway and the target gateway, the handover response sent by the target base station.

According to a ninth aspect, the present patent application provides a base station, including: a receiving unit, configured to receive a handover request sent by a source base station, where the handover request includes information about a first service of a terminal device; and a sending unit, configured to send a handover response to the source base station, where if the base station supports the first service, the handover response includes information about a handover instruction for the first service, and the handover instruction is used to instruct the terminal device to hand over the first service from the source base station to the base station.

With reference to the ninth aspect, in a first possible implementation of the ninth aspect, the handover request further includes information about a second service of the terminal device; and if the base station does not support the second service, the handover response further includes information about an air interface resource of the second service, the air interface resource is determined by the base station and on which interference coordination is performed, and the air interface resource is used by the source base station and the terminal device to transmit the second service.

With reference to the first possible implementation of the ninth aspect, in a second possible implementation of the ninth aspect, the handover request further includes quality of service information of the second service of the terminal device, and the air interface resource is determined by the base station based on the quality of service information.

With reference to any one of the ninth aspect, or the foregoing possible implementations of the ninth aspect, in a third possible implementation of the ninth aspect, the sending unit is further configured to send a path switch request to a gateway, where the path switch request includes the information about the first service; and the receiving unit is further configured to receive a path switch request acknowledgement sent by the gateway.

With reference to any one of the ninth aspect, or the foregoing possible implementations of the ninth aspect, in a fourth possible implementation of the ninth aspect, that the receiving unit is configured to receive the handover request sent by the source base station includes: the receiving unit is configured to receive, by using a controller, the handover request sent by the source base station; and that the sending unit is configured to send the handover response to the source base station includes: the sending unit is configured to send the handover response to the source base station by using the controller.

With reference to any one of the ninth aspect, or the first to third possible implementations of the ninth aspect, in a fifth possible implementation of the ninth aspect, that the receiving unit is configured to receive the handover request sent by the source base station includes: the receiving unit is configured to receive, by using a source gateway and a target gateway, the handover request sent by the source base station; and that the sending unit is configured to send the handover response to the source base station includes: the sending unit is configured to send the hand over response to the source base station by using the source gateway and the target gateway.

According to a tenth aspect, the present patent application provides a terminal device, including: a sending unit, configured to send a measurement report to a source base station; and a receiving unit, configured to receive a handover response, where if a first service of the terminal device is supported by a target base station, the handover response includes information about a handover instruction for the first service, and the handover instruction is used to instruct the terminal device to hand over the first service to the target base station.

With reference to the tenth aspect, in a first possible implementation of the tenth aspect, if a second service of the terminal device is not supported by the target base station, the handover response further includes information about an air interface resource of the second service, the air interface resource is determined by the target base station and on which interference coordination is performed, and the air interface resource is used by the terminal device and the source base station to transmit the second service.

With reference to the first possible implementation of the tenth aspect, in a second possible implementation of the tenth aspect, the measurement report includes information about supported service of the target base station.

According to an eleventh aspect, the present patent application provides a gateway, including: a receiving unit, configured to receive a path switch request sent by a target base station, where the path switch request includes information about a first service of a terminal device; and a sending unit, configured to send a path switch request acknowledgement to the target base station.

According to a twelfth aspect, the present patent application provides a gateway, including: a receiving unit, configured to receive a handover request sent by a source base station, where the handover request includes information about a first service of a terminal device; and a sending unit, configured to send the handover request to a target gateway, where the receiving unit is further configured to receive a handover response sent by the target gateway, and if the first service is supported by a target base station, the handover response includes information about a handover instruction for the first service, and the handover instruction is used to instruct the terminal device to hand over the first service to the target base station; and the sending unit is further configured to send the handover response to the source base station.

According to a thirteenth aspect, the present patent application provides a gateway, including: a receiving unit, configured to receive a handover request sent by a source gateway, the handover request includes information about a first service of a terminal device; and a sending unit, configured to send the handover request to a target base station, where the receiving unit is further configured to receive a handover response sent by the target base station, and if the first service is supported by the target base station, the handover response includes information about a handover instruction for the first service, and the handover instruction is used to instruct the terminal device to hand over the first service to the target base station; and the sending unit is further configured to send the handover response to the source gateway.

According to a fourteenth aspect, the present patent application provides a controller, including: a receiving unit, configured to receive a handover request sent by a source base station, where the handover request includes information about a first service of a terminal device; and a sending unit, configured to send the handover request to a target base station, where the receiving unit is further configured to receive a handover response sent by the target base station, and if the first service is supported by the target base station, the handover response includes information about a handover instruction for the first service, and the handover instruction is used to instruct the terminal device to hand over the first service to the target base station; and the sending unit is further configured to send the handover response to the source base station.

With reference to the twelfth, thirteenth or fourteenth aspect, in a possible implementation, the handover request further includes information about a second service of the terminal device; and if the second service is not supported by the target base station, the handover response further includes information about an air interface resource of the second service, the air interface resource is determined by the target base station and on which interference coordination is performed, and the air interface resource is used by the terminal device and the source base station to transmit the second service. Further, the handover request further includes quality of service information of the second service of the terminal device, and the air interface resource is determined based on the quality of service information of the second service of the terminal device.

According to a fifteenth aspect, the present patent application provides a base station, including: a transceiver; a memory, configured to store an instruction; and a processor, connected to the memory and the transceiver, and configured to execute the instruction, so as to perform the following steps when executing the instruction: instructing the transceiver to send a handover request to a target base station, where the handover request includes information about a first service of a terminal device; receiving, by using the transceiver, a handover response sent by the target base station, where if the first service is supported by the target base station, the handover response includes information about a handover instruction for the first service, and the handover instruction is used to instruct the terminal device to hand over the first service to the target base station; and instructing the transceiver to send a handover response to the terminal device.

With reference to the fifteenth aspect, in a first possible implementation of the fifteenth aspect, the handover request further includes information about a second service of the terminal device; and if the second service is not supported by the target base station, the handover response further includes information about an air interface resource of the second service, the air interface resource is determined by the target base station and on which interference coordination is performed, and the air interface resource is used by the source base station and the terminal device to transmit the second service.

With reference to the first possible implementation of the fifteenth aspect, in a second possible implementation of the fifteenth aspect, the handover request further includes quality of service information of the second service of the terminal device, and the air interface resource is determined by the target base station based on the quality of service information.

With reference to the fifteenth aspect, or the first or second possible implementation of the fifteenth aspect, in a third possible implementation of the fifteenth aspect, the processor further performs the following steps when executing the instruction: obtaining, by using the transceiver, information about supported service of the target base station; and if the target base station supports the first service, instructing the transceiver to send the handover request to the target base station.

With reference to the third possible implementation of the fifteenth aspect, in a fourth possible implementation of the fifteenth aspect, the processor performs the following step when executing the instruction: instructing the transceiver to receive a measurement report sent by the terminal device, where the measurement report includes the information about the at least one supported service of the target base station.

With reference to the fourth possible implementation of the fifteenth aspect, in a fifth possible implementation of the fifteenth aspect, the processor performs the following step when executing the instruction: instructing the transceiver to receive the information that is sent by a controller or the target base station and that is about the at least one supported service of the target base station.

With reference to any one of the fifteenth aspect, or the first to fifth possible implementations of the fifteenth aspect, in a sixth possible implementation of the fifteenth aspect, the sending a handover request to a target base station includes: sending the handover request to the target base station by using the controller; and the receiving a handover response sent by the target base station includes: receiving, by using the controller, the handover response sent by the target base station.

With reference to any one of the fifteenth aspect, or the first to fifth possible implementations of the fifteenth aspect, in a seventh possible implementation of the fifteenth aspect, the sending a handover request to a target base station includes: sending the handover request to the target base station by using a source gateway and a target gateway; and the receiving a handover response sent by the target base station includes: receiving, by using the source gateway and the target gateway, the handover response sent by the target base station.

According to a sixteenth aspect, the present patent application provides a base station, including: a transceiver; a memory, configured to store an instruction; and a processor, connected to the memory and the transceiver, and configured to execute the instruction, so as to perform the following steps when executing the instruction: receiving, by using the transceiver, a handover request sent by a source base station, where the handover request includes information about a first service of a terminal device and instructing the transceiver to send a handover response to the source base station, where if the base station supports the first service, the handover response includes information about a handover instruction for the first service, and the handover instruction is used to instruct the terminal device to hand over the first service from the source base station to the base station.

With reference to the sixteenth aspect, in a first possible implementation of the sixteenth aspect, the handover request further includes information about a second service of the terminal device; and if the base station does not support the second service, the handover response further includes information about an air interface resource of the second service, the air interface resource is determined by the processor and on which interference coordination is performed, and the air interface resource is used by the source base station and the terminal device to transmit the second service.

With reference to the first possible implementation of the sixteenth aspect, in a second possible implementation of the sixteenth aspect, the handover request further includes quality of service information of the second service of the terminal device, and the air interface resource is determined by the base station based on the quality of service information.

According to a seventeenth aspect, the present patent application provides a terminal device, including: a transceiver; a memory, configured to store an instruction; and a processor, connected to the memory and the transceiver, and configured to execute the instruction, so as to perform the following steps when executing the instruction: instructing the transceiver to send a measurement report to a source base station; and receiving, by using the transceiver, a handover response, where if a first service of the terminal device is supported by a target base station, the handover response includes information about a handover instruction for the first service, and the handover instruction is used to instruct the terminal device to hand over the first service of the terminal device to the target base station.

With reference to the seventeenth aspect, in a first possible implementation of the seventeenth aspect, if a second service of the terminal device is not supported by the target base station, the handover response further includes information about an air interface resource of the second service, the air interface resource is determined by the target base station and on which interference coordination is performed, and the air interface resource is used by the terminal device and the source base station to transmit the second service.

With reference to the first possible implementation of the seventeenth aspect, in a second possible implementation of the seventeenth aspect, the measurement report includes information about supported service of the target base station.

According to an eighteenth aspect, the present patent application provides a gateway, including: a transceiver; a memory, configured to store an instruction; and a processor, connected to the memory and the transceiver, and configured to execute the instruction, so as to perform the following steps when executing the instruction: receiving, by using the transceiver, a path switch request sent by a target base station, where the path switch request includes information about a first service of a terminal device; and instructing the transceiver to send a path switch request acknowledgement to the target base station.

According to a nineteenth aspect, the present patent application provides a gateway, including: a transceiver; a memory, configured to store an instruction; and a processor, connected to the memory and the transceiver, and configured to execute the instruction, so as to perform the following steps when executing the instruction: receiving, by using the transceiver, a handover request sent by a source base station, where the handover request includes information about a first service of a terminal device; instructing the transceiver to send the handover request to a target gateway; receiving, by using the transceiver, a handover response sent by the target gateway, where if the first service is supported by a target base station, the handover response includes information about a handover instruction for the first service, and the handover instruction is used to instruct the terminal device to hand over the first service to the target base station; and sending the handover response to the source base station by using the transceiver.

According to a twentieth aspect, the present patent application provides a gateway, including: a transceiver; a memory, configured to store an instruction; and a processor, connected to the memory and the transceiver, and configured to execute the instruction, so as to perform the following steps when executing the instruction: receiving, by using the transceiver, a handover request sent by a source gateway, where the handover request includes information about a first service of a terminal device; instructing the transceiver to send the handover request to a target base station; receiving, by using the transceiver, a handover response sent by the target base station, where if the first service is supported by the target base station, the handover response includes information about a handover instruction for the first service, and the handover instruction is used to instruct the terminal device to hand over the first service to the target base station; and sending the handover response to the source gateway by using the transceiver.

According to a twenty-first aspect, the present patent application provides a controller, including: a transceiver; a memory, configured to store an instruction; and a processor, connected to the memory and the transceiver, and configured to execute the instruction, so as to perform the following steps when executing the instruction: receiving, by using the transceiver, a handover request sent by a source base station, where the handover request includes information about a first service of a terminal device; instructing the transceiver to send the handover request to a target base station; receiving, by using the transceiver, a handover response sent by the target base station, where if the first service is supported by the target base station, the handover response includes information about a handover instruction for the first service, and the handover instruction is used to instruct the terminal device to hand over the first service to the target base station; and instructing the transceiver to send the handover response to the source base station.

With reference to the nineteenth, twentieth or twenty-first aspect, in a possible implementation, the handover request further includes information about a second service of the terminal device; and if the second service is not supported by the target base station, the handover response further includes information about an air interface resource of the second service, the air interface resource is determined by the target base station and on which interference coordination is performed, and the air interface resource is used by the terminal device and the source base station to transmit the second service. Further, the handover request further includes quality of service information of the second service of the terminal device, and the air interface resource is determined based on the quality of service information of the second service of the terminal device.

According to a twenty-second aspect, the present patent application provides a handover method, including: sending, by a source base station, a handover request to a target base station, where the handover request includes information about a second service of a terminal device; and receiving, by the source base station, a handover response, where if the second service is not supported by the target base station, the handover response includes information about an air interface resource of the second service, the air interface resource is determined by the target base station and on which interference coordination is performed, and the air interface resource is used by the source base station and the terminal device to transmit the second service.

With reference to the twenty-second aspect, in a first possible implementation of the twenty-second aspect, the handover request further includes quality of service information of the second service of the terminal device, and the air interface resource is determined based on the quality of service information.

With reference to the twenty-second aspect or the first possible implementation of the twenty-second aspect, in a second possible implementation of the twenty-second aspect, if a first service is supported by the target base station, the handover request further includes information about the first service of the terminal device; the handover response further includes a handover instruction for the first service, and the handover instruction is used to instruct the terminal device to hand over the first service to the target base station; and the method further includes: sending, by the source base station, the handover response to the terminal device.

With reference to any one of the twenty-second aspect, or the foregoing possible implementations of the twenty-second aspect, in a third possible implementation of the twenty-second aspect, the method further includes: obtaining, by the source base station, information about supported service of the target base station; and the sending, by a source base station, a handover request to a target base station includes: if the target base station supports at least some services of the terminal device, sending, by the source base station, the handover request to the target base station.

With reference to the third possible implementation of the twenty-second aspect, in a fourth possible implementation of the twenty-second aspect, the obtaining, by the source base station, information about supported service of the target base station includes: receiving, by the source base station, a measurement report sent by the terminal device, where the measurement report includes the information about the at least one supported service of the target base station.

With reference to the third possible implementation of the twenty-second aspect, in a fifth possible implementation of the twenty-second aspect, the obtaining, by the source base station, information about supported service of the target base station includes: receiving, by the source base station, the information that is sent by a controller or the target base station and that is about the at least one supported service of the target base station.

With reference to any one of the twenty-second aspect, or the foregoing possible implementations of the twenty-second aspect, in a sixth possible implementation of the twenty-second aspect, the sending, by a source base station, a handover request to a target base station includes: sending, by the source base station, the handover request to the target base station by using the controller; and the receiving, by the source base station, a handover response sent by the target base station includes: receiving, by the source base station by using the controller, the handover response sent by the target base station.

With reference to any one of the twenty-second aspect, or the foregoing possible implementations of the twenty-second aspect, in a seventh possible implementation of the twenty-second aspect, the sending, by a source base station, a handover request to a target base station includes: sending, by the source base station, the handover request to the target base station by using a source gateway and a target gateway; and the receiving, by the source base station, a handover response sent by the target base station includes: receiving, by the source base station by using the source gateway and the target gateway, the handover response sent by the target base station.

According to a twenty-third aspect, the present patent application provides a handover method, including: receiving, by a target base station, a handover request sent by a source base station, where the handover request includes information about a second service of a terminal device; sending, by the target base station, a handover response, where if the target base station does not support the second service, the handover response includes information about an air interface resource of the second service, the air interface resource is determined by the target base station and on which interference coordination is performed, and the air interface resource is used by the source base station and the terminal device to transmit the second service.

With reference to the twenty-third aspect, in a first possible implementation of the twenty-third aspect, the handover request further includes quality of service information of the second service of the terminal device, and the air interface resource is determined based on the quality of service information of the second service of the terminal device.

With reference to the twenty-third aspect or the first possible implementation of the twenty-third aspect, in a second possible implementation of the twenty-third aspect, the handover request further includes information about a first service of the terminal device; and if the target base station supports the first service, the handover response further includes a handover instruction for the first service, and the handover instruction is used to instruct the terminal device to hand over the first service to the target base station.

With reference to the second possible implementation of the twenty-third aspect, in a third possible implementation of the twenty-third aspect, the method further includes: sending, by the target base station, a path switch request to a gateway, where the path switch request includes the information about the first service; and receiving, by the target base station, a path switch request acknowledgement sent by the gateway.

With reference to any one of the twenty-third aspect, or the foregoing possible implementations of the twenty-third aspect, in a fourth possible implementation of the twenty-third aspect, the receiving, by a target base station, a handover request sent by a source base station includes: receiving, by the target base station, the handover request sent by a controller; and the sending, by the target base station, a handover response to the source base station includes: sending, by the target base station, the handover response to the source base station by using the controller.

With reference to any one of the twenty-third aspect, or the first to third possible implementations of the twenty-third aspect, in a fifth possible implementation of the twenty-third aspect, the receiving, by a target base station, a handover request sent by a source base station includes: receiving, by the target base station by using a source gateway and a target gateway, the handover request; and the sending, by the target base station, a handover response to the source base station includes: sending, by the target base station, the handover response by using the source gateway and the target gateway.

According to a twenty-fourth aspect, the present patent application provides a handover method, including: sending, by a terminal device, a measurement report to a source base station; and receiving, by the terminal device, a handover response, where if a second service of the terminal device is not supported by a target base station, the handover response includes information about an air interface resource of the second service, the air interface resource is determined by the target base station and on which interference coordination is performed, and the air interface resource is used by the terminal device and the source base station to transmit the second service.

With reference to the twenty-fourth aspect, in a first possible implementation of the twenty-fourth aspect, if a first service of the terminal device is supported by the target base station, the handover response further includes a handover instruction for the first service, the handover instruction is used to instruct the terminal device to hand over the first service to the target base station, and the first service is supported by the target base station.

With reference to the twenty-fourth aspect or the first possible implementation of the twenty-fourth aspect, in a second possible implementation of the twenty-fourth aspect, the measurement report includes information about supported service of the target base station.

According to a twenty-fifth aspect, the present patent application provides a handover method, including: receiving, by a source gateway, a handover request sent by a source base station, where the handover request includes information about a second service of a terminal device; sending, by the source gateway, the handover request to a target gateway; receiving, by the source gateway, a handover response sent by the target gateway, where if the second service is not supported by a target base station, the handover response includes information about an air interface resource of the second service, the air interface resource is determined by the target base station and on which interference coordination is performed, and the air interface resource is used by the terminal device and the source base station to transmit the second service; and sending, by the source gateway, the handover response to the source base station.

According to a twenty-sixth aspect, the present patent application provides a handover method, including: receiving, by a target gateway, a handover request sent by a source gateway, where the handover request includes information about a second service of a terminal device; sending, by the target gateway, the handover request to a target base station; receiving, by the target gateway, a handover response sent by the target base station, where if the second service is not supported by the target base station, the handover response includes information about an air interface resource of the second service, the air interface resource is determined by the target base station and on which interference coordination is performed, and the air interface resource is used by the terminal device and a source base station to transmit the second service; and sending, by the target gateway, the handover response to the source gateway.

According to a twenty-seventh aspect, the present patent application provides a handover method, including: receiving, by a controller, a handover request sent by a source base station, where the handover request includes information about a second service of a terminal device; sending, by the controller, the handover request to a target base station;

receiving, by the controller, a handover response sent by the target base station, where if the second service is not supported by the target base station, the handover response includes information about an air interface resource of the second service, the air interface resource is determined by the target base station and on which interference coordination is performed, and the air interface resource is used by the terminal device and the source base station to transmit the second service; and sending, by the controller, the handover response to the source base station.

With reference to the twenty-fifth or twenty-sixth or twenty-seventh aspect, in a possible implementation, the handover request further includes quality of service information of the second service of the terminal device, and the air interface resource is determined based on the quality of service information of the second service of the terminal device. Further, the handover request further includes information about a first service of the terminal device; and if the first service is supported by the target base station, the handover response further includes a handover instruction for the first service, and the handover instruction is used to instruct the terminal device to hand over the first service to the target base station.

According to a twenty-eighth aspect, the present patent application provides a base station, including: a sending unit, configured to send a handover request to a target base station, where the handover request includes information about a second service of a terminal device; and a receiving unit, configured to receive a handover response sent by the target base station, where if the second service is not supported by the target base station, the handover response includes information about an air interface resource of the second service, the air interface resource is determined by the target base station and on which interference coordination is performed, and the air interface resource is used by the source base station and the terminal device to transmit the second service; and the sending unit is further configured to send the handover response to the terminal device.

With reference to the twenty-eighth aspect, in a first possible implementation of the twenty-eighth aspect, the handover request further includes quality of service information of the second service of the terminal device, and the air interface resource is determined based on the quality of service information.

With reference to the twenty-eighth aspect or the first possible implementation of the twenty-eighth aspect, in a second possible implementation of the twenty-eighth aspect, if a first service is supported by the target base station, the handover request further includes information about the first service of the terminal device; the handover response further includes a handover instruction for the first service, and the handover instruction is used to instruct the terminal device to hand over the first service to the target base station; and the sending unit is further configured to send the handover response to the terminal device.

With reference to any one of the twenty-eighth aspect, or the foregoing possible implementations of the twenty-eighth aspect, in a third possible implementation of the twenty-eighth aspect, the receiving unit is further configured to obtain information about supported service of the target base station; and that the sending unit is configured to send the handover request to the target base station includes: if the target base station supports at least some services of the terminal device, the sending unit is configured to send the handover request to the target base station.

With reference to any one of the twenty-eighth aspect, or the first to third possible implementations of the twenty-eighth aspect, in a fourth possible implementation of the twenty-eighth aspect, that the receiving unit is further configured to obtain the information about the at least one supported service of the target base station includes: the receiving unit is further configured to receive a measurement report sent by the terminal device, where the measurement report includes the information about the at least one supported service of the target base station.

With reference to any one of the twenty-eighth aspect, or the first to third possible implementations of the twenty-eighth aspect, in a fifth possible implementation of the twenty-eighth aspect, that the receiving unit is further configured to obtain the information about the at least one supported service of the target base station includes: the receiving unit is further configured to receive the information that is sent by a controller or the target base station and that is about the at least one supported service of the target base station.

With reference to any one of the twenty-eighth aspect, or the foregoing possible implementations of the twenty-eighth aspect, in a sixth possible implementation of the twenty-eighth aspect, that the sending unit is configured to send the handover request to the target base station includes: the sending unit is configured to send the handover request to the target base station by using the controller; and that the receiving unit is configured to receive the handover response sent by the target base station includes: the receiving unit is configured to receive, by using the controller, the handover response sent by the target base station.

With reference to any one of the twenty-eighth aspect, or the first to sixth possible implementations of the twenty-eighth aspect, in a seventh possible implementation of the twenty-eighth aspect, that the sending unit is configured to send the handover request to the target base station includes: the sending unit is configured to send the handover request to the target base station by using a source gateway and a target gateway; and that the receiving unit is configured to receive the handover response sent by the target base station includes: the receiving unit is configured to receive, by using the source gateway and the target gateway, the handover response sent by the target base station.

According to a twenty-ninth aspect, the present patent application provides a base station, including: a receiving unit, configured to receive a handover request sent by a source base station, where the handover request includes information about a second service of a terminal device; a sending unit, configured to send a handover response to the source base station, where if the target base station does not support the second service, the handover response includes information about an air interface resource of the second service, the air interface resource is determined by the target base station and on which interference coordination is performed, and the air interface resource is used by the source base station and the terminal device to transmit the second service.

With reference to the twenty-ninth aspect, in a first possible implementation of the twenty-ninth aspect, the handover request further includes quality of service information of the second service of the terminal device, and the air interface resource is determined based on the quality of service information of the second service of the terminal device.

With reference to the first possible implementation of the twenty-ninth aspect, in a second possible implementation of the twenty-ninth aspect, the handover request further includes information about a first service of the terminal device; and if the target base station supports the first service, the handover response further includes a handover instruction for the first service, and the handover instruction is used to instruct the terminal device to hand over the first service to the target base station.

With reference to the second possible implementation of the twenty-ninth aspect, in a third possible implementation of the twenty-ninth aspect, the sending unit is further configured to send a path switch request to a gateway, where the path switch request includes the information about the first service; and the receiving unit is further configured to receive a path switch request acknowledgement sent by the gateway.

With reference to any one of the twenty-ninth aspect, or the foregoing possible implementations of the twenty-ninth aspect, in a fourth possible implementation of the twenty-ninth aspect, that the receiving unit is configured to receive the handover request sent by the source base station includes: the receiving unit is configured to receive, by using a controller, the handover request sent by the source base station; and that the sending unit is configured to send the handover response to the source base station includes: the sending unit is configured to send the handover response to the source base station by using the controller.

With reference to any one of the twenty-ninth aspect, or the first to third possible implementations of the twenty-ninth aspect, in a fifth possible implementation of the twenty-ninth aspect, that the receiving unit is configured to receive the handover request sent by the source base station includes: the receiving unit is configured to receive, by using a source gateway and a target gateway, the handover request sent by the source base station; and that the sending unit is configured to send the handover response to the source base station includes: the sending unit is configured to send the handover response to the source base station by using the source gateway and the target gateway.

According to a thirtieth aspect, the present patent application provides a terminal device, including: a sending unit, configured to send a measurement report to a source base station; a receiving unit, configured to receive a handover response, where if a second service of the terminal device is not supported by a target base station, the handover response includes information about an air interface resource of the second service, the air interface resource is determined by the target base station and on which interference coordination is performed, and the air interface resource is used by the terminal device and the source base station to transmit the second service.

With reference to the thirtieth aspect, in a first possible implementation of the thirtieth aspect, if a first service of the terminal device is supported by the target base station, the handover response further includes a handover instruction for the first service, the handover instruction is used to instruct the terminal device to hand over the first service to the target base station, and the first service is supported by the target base station.

With reference to the thirtieth aspect or the first possible implementation of the thirtieth aspect, in a second possible implementation of the thirtieth aspect, the measurement report includes information about supported service of the target base station.

According to a thirty-first aspect, the present patent application provides a gateway, including: a receiving unit, configured to receive a handover request sent by a source base station, where the handover request includes information about a second service of a terminal device; and a sending unit, configured to send the handover request to a target gateway, where the receiving unit is further configured to receive a handover response sent by the target gateway, and if the second service is not supported by a target base station, the handover response includes information about an air interface resource of the second service, the air interface resource is determined by the target base station and on which interference coordination is performed, and the air interface resource is used by the terminal device and the source base station to transmit the second service; and the sending unit is further configured to send the handover response to the source base station.

According to a thirty-second aspect, the present patent application provides a gateway, including: a receiving unit, configured to receive a handover request sent by a source gateway, where the handover request includes information about a second service of a terminal device; and a sending unit, configured to send the handover request to a target base station, where the receiving unit is further configured to receive a handover response sent by the target base station, and if the second service is not supported by the target base station, the handover response includes information about an air interface resource of the second service, the air interface resource is determined by the target base station and on which interference coordination is performed, and the air interface resource is used by the terminal device and a source base station to transmit the second service; and the sending unit is further configured to send the handover response to the source gateway.

According to a thirty-third aspect, the present patent application provides a controller, including: a receiving unit, configured to receive a handover request sent by a source base station, where the handover request includes information about a second service of a terminal device; and a sending unit, configured to send the handover request to a target base station, where the receiving unit is further configured to: receive a handover response sent by the target base station, and if the second service is not supported by the target base station, the handover response includes information about an air interface resource of the second service, the air interface resource is determined by the target base station and on which interference coordination is performed, and the air interface resource is used by the terminal device and the source base station to transmit the second service; and the sending unit is further configured to send the handover response to the source base station.

With reference to the thirty-first, thirty-second or thirty-third aspect, in a first possible implementation of the thirty-third aspect, the handover request further includes quality of service information of the second service of the terminal device, and the air interface resource is determined based on the quality of service information of the second service of the terminal device. Further, the handover request further includes information about a first service of the terminal device; and if the first service is supported by the target base station, the handover response further includes a handover instruction for the first service, and the handover instruction is used to instruct the terminal device to hand over the first service to the target base station.

According to a thirty-fourth aspect, the present patent application provides a base station, including: a transceiver; a memory, configured to store an instruction; and a processor, connected to the memory and the transceiver, and configured to execute the instruction, so as to perform the following steps when executing the instruction: instructing the transceiver to send a handover request to a target base station, where the handover request includes information about a second service of a terminal device; receiving, by using the transceiver, a handover response sent by the target base station, where if the second service is not supported by the target base station, the handover response includes information about an air interface resource of the second service, the air interface resource is determined by the target base station and on which interference coordination is performed, and the air interface resource is used by the source base station and the terminal device to transmit the second service; and sending the handover response to the terminal device by using the transceiver.

With reference to the thirty-fourth aspect, in a first possible implementation of the thirty-fourth aspect, the handover request further includes quality of service information of the second service of the terminal device, and the air interface resource is determined based on the quality of service information.

With reference to the thirty-fourth aspect or the first possible implementation of the thirty-fourth aspect, in a second possible implementation of the thirty-fourth aspect, if a first service is supported by the target base station, the handover request further includes information about the first service of the terminal device; the handover response further includes a handover instruction for the first service, and the handover instruction is used to instruct the terminal device to hand over the first service to the target base station; and the controller further performs the following step when executing the instruction: sending the handover response to the terminal device by using the transceiver.

With reference to any one of the thirty-fourth aspect, or the foregoing possible implementations of the thirty-fourth aspect, in a third possible implementation of the thirty-fourth aspect, the processor further performs the following step when executing the instruction: obtaining, by using the transceiver, information about supported service of the target base station; and the sending a handover request to a target base station includes: if the target base station supports at least some services of the terminal device, sending the handover request to the target base station.

With reference to any one of the thirty-fourth aspect, or the first to third possible implementations of the thirty-fourth aspect, in a fourth possible implementation of the thirty-fourth aspect, the obtaining information about supported service of the target base station includes: receiving a measurement report sent by the terminal device, where the measurement report includes the information about the at least one supported service of the target base station.

With reference to any one of the thirty-fourth aspect, or the first to third possible implementations of the thirty-fourth aspect, in a fifth possible implementation of the thirty-fourth aspect, the obtaining information about supported service of the target base station includes: receiving the information that is sent by the controller or the target base station and that is about the at least one supported service of the target base station.

With reference to any one of the thirty-fourth aspect, or the foregoing possible implementations of the thirty-fourth aspect, in a sixth possible implementation of the thirty-fourth aspect, the sending a handover request to a target base station includes: sending the handover request to the target base station by using the controller; and the receiving a handover response sent by the target base station includes: receiving, by using the controller, the handover response sent by the target base station.

With reference to any one of the thirty-fourth aspect, or the first to sixth possible implementations of the thirty-fourth aspect, in a seventh possible implementation of the thirty-fourth aspect, the sending a handover request to a target base station includes: sending the handover request to the target base station by using a source gateway and a target gateway; and the receiving a handover response sent by the target base station includes: receiving, by using the source gateway and the target gateway, the handover response sent by the target base station.

According to a thirty-fifth aspect, the present patent application provides a base station, including: a transceiver; a memory, configured to store an instruction; and a processor, connected to the memory and the transceiver, and configured to execute the instruction, so as to perform the following steps when executing the instruction: instructing the transceiver to receive a handover request sent by a source base station, where the handover request includes information about a second service of a terminal device; and sending a handover response to the source base station, where if the target base station does not support the second service, the handover response includes information about an air interface resource of the second service, the air interface resource is determined by the target base station and on which interference coordination is performed, and the air interface resource is used by the source base station and the terminal device to transmit the second service.

With reference to the thirty-fifth aspect, in a first possible implementation of the thirty-fifth aspect, the handover request further includes quality of service information of the second service of the terminal device, and the air interface resource is determined based on the quality of service information of the second service of the terminal device.

With reference to the first possible implementation of the thirty-fifth aspect, in a second possible implementation of the thirty-fifth aspect, the handover request further includes information about a first service of the terminal device; and if the target base station supports the first service, the handover response further includes a handover instruction for the first service, and the handover instruction is used to instruct the terminal device to hand over the first service to the target base station.

With reference to the second possible implementation of the thirty-fifth aspect, in a third possible implementation of the thirty-fifth aspect, the processor further performs the following steps when executing the instruction: sending a path switch request to a gateway by using the transceiver, where the path switch request includes the information about the first service; and receiving, by using the transceiver, a path switch request acknowledgement sent by the gateway.

With reference to any one of the thirty-fifth aspect, or the foregoing possible implementations of the thirty-fifth aspect, in a fourth possible implementation of the thirty-fifth aspect, the receiving a handover request sent by a source base station includes: receiving, by using a controller, the handover request sent by the source base station; and the sending a handover response to the source base station includes: sending the handover response to the source base station by using the controller.

With reference to any one of the thirty-fifth aspect, or the first to third possible implementations of the thirty-fifth aspect, in a fifth possible implementation of the thirty-fifth aspect, the receiving a handover request sent by a source base station includes: receiving, by using a source gateway and a target gateway, the handover request sent by the source base station; and the sending a handover response to the source base station includes: sending the handover response to the source base station by using the source gateway and the target gateway.

According to a thirty-sixth aspect, the present patent application provides a terminal device, including: a transceiver; a memory, configured to store an instruction; and a processor, connected to the memory and the transceiver, and configured to execute the instruction, so as to perform the following steps when executing the instruction: sending a measurement report to a source base station by using the transceiver; and instructing the transceiver to receive a handover response, where if a second service of the terminal device is not supported by a target base station, the handover response includes information about an air interface resource of the second service, the air interface resource is determined by the target base station and on which interference coordination is performed, and the air interface resource is used by the terminal device and the source base station to transmit the second service.

With reference to the thirty-sixth aspect, in a first possible implementation of the thirty-sixth aspect, if a first service of the terminal device is supported by the target base station, the handover response further includes a handover instruction for the first service, the handover instruction is used to instruct the terminal device to hand over the first service to the target base station, and the first service is supported by the target base station.

With reference to the thirty-sixth aspect or the first possible implementation of the thirty-sixth aspect, in a second possible implementation of the thirty-sixth aspect, the measurement report includes information about supported service of the target base station.

According to a thirty-seventh aspect, the present patent application provides a gateway, including: a transceiver; a memory, configured to store an instruction; and a processor, connected to the memory and the transceiver, and configured to execute the instruction, so as to perform the following steps when executing the instruction: instructing the transceiver to receive a handover request sent by a source base station, where the handover request includes information about a second service of a terminal device; sending the handover request to a target gateway by using the transceiver; instructing the transceiver to receive a handover response sent by the target gateway, where if the second service is not supported by a target base station, the handover response includes information about an air interface resource of the second service, the air interface resource is determined by the target base station and on which interference coordination is performed, and the air interface resource is used by the terminal device and the source base station to transmit the second service; and sending the handover response to the source base station by using the transceiver.

According to a thirty-eighth aspect, the present patent application provides a gateway, including: a transceiver; a memory, configured to store an instruction; and a processor, connected to the memory and the transceiver, and configured to execute the instruction, so as to perform the following steps when executing the instruction: instructing the transceiver to receive a handover request sent by a source gateway, where the handover request includes information about a second service of a terminal device; sending the handover request to a target base station by using the transceiver; instructing the transceiver to receive a handover response sent by the target base station, where if the second service is not supported by the target base station, the handover response includes information about an air interface resource of the second service, the air interface resource is determined by the target base station and on which interference coordination is performed, and the air interface resource is used by the terminal device and a source base station to transmit the second service; and sending the handover response to the source gateway by using the transceiver.

According to a thirty-ninth aspect, the present patent application provides a controller, including: a transceiver; a memory, configured to store an instruction; and a processor, connected to the memory and the transceiver, and configured to execute the instruction, so as to perform the following steps when executing the instruction: instructing the transceiver to receive a handover request sent by a source base station, where the handover request includes information about a second service of a terminal device; sending the handover request to a target base station by using the transceiver; instructing the transceiver to receive a handover response sent by the target base station, where if the second service is not supported by the target base station, the handover response includes information about an air interface resource of the second service, the air interface resource is determined by the target base station and on which interference coordination is performed, and the air interface resource is used by the terminal device and the source base station to transmit the second service; and sending the handover response to the source base station by using the transceiver.

With reference to the thirty-seventh, thirty-eighth or thirty-ninth aspect, in a possible implementation, the handover request further includes quality of service information of the second service of the terminal device, and the air interface resource is determined based on the quality of service information of the second service of the terminal device. In another possible implementation, the handover request further includes information about a first service of the terminal device; and if the first service is supported by the target base station, the handover response further includes a handover instruction for the first service, and the handover instruction is used to instruct the terminal device to hand over the first service to the target base station.

According to a fortieth aspect, the present patent application provides a handover method, including: if a target base station supports a service of a terminal device, sending, by a source base station, a handover request to the target base station; receiving, by the source base station, a handover response sent by the target base station; and sending, by the source base station, the handover response to the terminal device.

With reference to the fortieth aspect, in a first possible implementation of the fortieth aspect, the method further includes: receiving, by the source base station, a measurement report of the terminal device, where the measurement report includes information about supported service of the target base station.

With reference to the fortieth aspect, in a second possible implementation of the fortieth aspect, the method further includes: receiving, by the source base station, information that is sent by a controller or the target base station and that is about supported service of the target base station.

According to a forty-first aspect, the present patent application provides a base station, including: a sending unit, configured to: if a target base station supports all services of a terminal device, send a handover request to the target base station; and a receiving unit, configured to receive a handover response sent by the target base station, where the sending unit is further configured to send the handover response to the terminal device.

With reference to the forty-first aspect, in a first possible implementation of the forty-first aspect, the receiving unit is further configured to: receive a measurement report of the terminal device, where the measurement report includes information about supported service of the target base station.

With reference to the forty-first aspect, in a second possible implementation of the forty-first aspect, the receiving unit is further configured to: receive information that is sent by a controller or the target base station and that is about supported service of the target base station.

According to a forty-second aspect, the present patent application provides a base station, including: a transceiver; a memory, configured to store an instruction; and a processor, connected to the memory and the transceiver, and configured to execute the instruction, so as to perform the following steps when executing the instruction: if a target base station supports all services of a terminal device, instructing the transceiver to send a handover request to the target base station; and receiving, by using the transceiver, a handover response sent by the target base station; and instructing the transceiver to send the handover response to the terminal device.

With reference to the forty-second aspect, in a first possible implementation of the forty-second aspect, the receiving unit is further configured to: the processor further performs the following step when executing the instruction: receiving a measurement report of the terminal device by using the transceiver, where the measurement report includes information about supported service of the target base station.

With reference to the forty-second aspect, in a second possible implementation of the forty-second aspect, the processor further performs the following step when executing the instruction: receiving, by using the transceiver, information that is sent by a controller or the target base station and that is about supported service of the target base station.

According to a forty-third aspect, the present patent application provides an interference coordination method, including: if a target base station does not support all services of a terminal device, sending, by a source base station, an interference coordination request to the target base station receiving, by the source base station, an interference coordination response sent by the target base station, where the interference coordination response includes information about an air interface resource, the air interface resource is determined by the target base station and on which interference coordination is performed, and the air interface resource is used by the terminal device and the source base station to transmit a service; and sending, by the source base station, the interference coordination response to the terminal device.

With reference to the forty-third aspect, in a first possible implementation of the forty-third aspect, the interference coordination request includes quality of service information of the terminal device, and the air interface resource is determined by the target base station based on the quality of service information.

With reference to the forty-third aspect, in a second possible implementation of the forty-third aspect, the interference coordination request includes request information of the air interface resource, and the request information of the air interface resource is used to indicate information about an air interface resource on which the target base station is expected to perform interference coordination.

With reference to any one of the forty-third aspect, or the foregoing possible implementations of the forty-third aspect, in a third possible implementation of the forty-third aspect, the method further includes: receiving, by the source base station, a measurement report of the terminal device, where the measurement report includes information about supported service of the target base station.

With reference to any one of the forty-third aspect, or the first to third possible implementations of the forty-third aspect, in a fourth possible implementation of the forty-third aspect, the method further includes: receiving, by the source base station, the information that is sent by a controller or the target base station and that is about the at least one supported service of the target base station.

With reference to any one of the forty-third aspect, or the foregoing possible implementations of the forty-third aspect, in a fifth possible implementation of the forty-third aspect, the sending, by a source base station, an interference coordination request to the target base station includes: sending, by the source base station, the interference coordination request to the target base station by using the controller; and the receiving, by the source base station, an interference coordination response sent by the target base station includes: receiving, by the source base station by using the controller, the interference coordination response sent by the target base station.

With reference to any one of the forty-third aspect, or the first to fourth possible implementations of the forty-third aspect, in a sixth possible implementation of the forty-third aspect, the sending, by a source base station, an interference coordination request to the target base station includes: sending, by the source base station, the interference coordination request to the target base station by using the controller; and the receiving, by the source base station, an interference coordination response sent by the target base station includes: receiving, by the source base station by using the controller, the interference coordination response sent by the target base station.

According to a forty-fourth aspect, the present patent application provides an interference coordination method, including: receiving, by a target base station, an interference coordination request from a source base station; and sending, by the target base station, an interference coordination response to the source base station, where the interference coordination response includes information about an air interface resource, the air interface resource is determined by the target base station and on which interference coordination is performed, and the air interface resource is used by a terminal device and the source base station to transmit a service.

With reference to the forty-fourth aspect, in a first possible implementation of the forty-fourth aspect, the interference coordination request includes quality of service information of the terminal device, and the air interface resource is determined by the target base station based on the quality of service information.

With reference to the forty-fourth aspect, in a second possible implementation of the forty-fourth aspect, the interference coordination request includes request information of the air interface resource, and the request information of the air interface resource is used to indicate information about an air interface resource on which the target base station is expected to perform interference coordination.

With reference to any one of the forty-fourth aspect, or the foregoing possible implementations of the forty-fourth aspect, in a third possible implementation of the forty-fourth aspect, the receiving, by a target base station, an interference coordination request from a source base station includes: receiving, by the target base station, the interference coordination request from the source base station by using a controller; and the sending, by the target base station, an interference coordination response to the source base station includes: sending, by the target base station, the interference coordination response to the source base station by using the controller.

With reference to the forty-fourth aspect, or the first or second possible implementation of the forty-fourth aspect, in a fourth possible implementation of the forty-fourth aspect, the receiving, by a target base station, an interference coordination request from a source base station includes: receiving, by the target base station, the interference coordination request from the source base station by using a source gateway and a target gateway; and the sending, by the target base station, an interference coordination response to the source base station includes: sending, by the target base station, the interference coordination response to the source base station by using the target gateway and the source gateway.

According to a forty-fifth aspect, the present patent application provides an interference coordination method, including: sending, by a terminal device, a measurement report to a source base station; and receiving, by the terminal device, an interference coordination response sent by the source base station, where the interference coordination response includes information about an air interface resource, the air interface resource is determined by a target base station and on which interference coordination is performed, and the air interface resource is used by the terminal device and the source base station to transmit a service.

With reference to the forty-fifth aspect, in a first possible implementation of the forty-fifth aspect, the measurement report includes information about supported service of the target base station.

According to a forty-sixth aspect, the present patent application provides an interference coordination method, including: receiving, by a source gateway, an interference coordination request sent by a source base station; sending, by the source gateway, the interference coordination request to a target gateway; receiving, by the source gateway, an interference coordination response sent by the target gateway, where the interference coordination response includes information about an air interface resource, the air interface resource is determined by a target base station and on which interference coordination is performed, and the air interface resource is used by a terminal device and the source base station to transmit a service; and sending, by the source gateway, the interference coordination response to the source base station.

According to a forty-seventh aspect, the present patent application provides an interference coordination method, including: receiving, by a target gateway, an interference coordination request sent by a source gateway; sending, by the target gateway, the interference coordination request to a target base station; receiving, by the target gateway, an interference coordination response sent by the target base station, where the interference coordination response includes information about an air interface resource, the air interface resource is determined by the target base station and on which interference coordination is performed, and the air interface resource is used by a terminal device and a source base station to transmit a service; and sending, by the target gateway, the interference coordination response to the source gateway.

With reference to the forty-sixth or forty-seventh aspect, in a possible implementation, the interference coordination request further includes quality of service information of the terminal device, and the air interface resource is determined based on the quality of service information of the terminal device. In another possible implementation, the interference coordination request includes request information of the air interface resource, and the request information of the air interface resource is used to indicate information about an air interface resource on which the target base station is expected to perform interference coordination.

According to a forty-eighth aspect, the present patent application provides a base station, including: a sending unit, configured to: if a target base station does not support all services of a terminal device, send an interference coordination request to the target base station; and a receiving unit, configured to receive an interference coordination response sent by the target base station, where the interference coordination response includes information about an air interface resource, the air interface resource is determined by the target base station and on which interference coordination is performed, and the air interface resource is used by the terminal device and the source base station to transmit a service; and the sending unit is further configured to send, by the source base station, the interference coordination response to the terminal device.

With reference to the forty-eighth aspect, in a first possible implementation of the forty-eighth aspect, the interference coordination request further includes quality of service information of a second service of the terminal device, and the air interface resource is determined based on the quality of service information.

With reference to the forty-eighth aspect, in a second possible implementation of the forty-eighth aspect, the interference coordination request includes request information of the air interface resource, and the request information of the air interface resource is used to indicate information about an air interface resource on which the target base station is expected to perform interference coordination.

With reference to any one of the forty-eighth aspect, or the foregoing possible implementations of the forty-eighth aspect, in a third possible implementation of the forty-eighth aspect, the receiving unit is further configured to obtain information about supported service of the target base station; and that the sending unit is configured to send the interference coordination request to the target base station includes: if the target base station does not support all the services of the terminal device, the sending unit is configured to send the interference coordination request to the target base station.

With reference to the third possible implementation of the forty-eighth aspect, in a fourth possible implementation of the forty-eighth aspect, that the receiving unit is further configured to obtain the information about the at least one supported service of the target base station includes: the receiving unit is further configured to obtain, by using a measurement report, the information about the at least one supported service of the target base station.

With reference to the third possible implementation of the forty-eighth aspect, in a fifth possible implementation of the forty-eighth aspect, that the receiving unit is further configured to obtain the information about the at least one supported service of the target base station includes: the receiving unit is further configured to receive the information that is sent by a controller or the target base station and that is about the at least one supported service of the target base station.

With reference to any one of the forty-eighth aspect, or the foregoing possible implementations of the forty-eighth aspect, in a sixth possible implementation of the forty-eighth aspect, that the sending unit is configured to send the interference coordination request to the target base station includes: the sending unit is configured to send the interference coordination request to the target base station by using the controller; and that the receiving unit is configured to receive the interference coordination response sent by the target base station includes: the receiving unit is configured to receive, by using the controller, the interference coordination response sent by the target base station.

With reference to any one of the forty-eighth aspect, or the first to sixth possible implementations of the forty-eighth aspect, in a seventh possible implementation of the forty-eighth aspect, that the sending unit is configured to send the interference coordination request to the target base station includes: the sending unit is configured to send the interference coordination request to the target base station by using a source gateway and a target gateway; and that the receiving unit is configured to receive the interference coordination response sent by the target base station includes: the receiving unit is configured to receive, by using the source gateway and the target gateway, the interference coordination response sent by the target base station.

According to a forty-ninth aspect, the present patent application provides a base station, including: a receiving unit, configured to receive an interference coordination request sent by a source base station; and a sending unit, configured to send an interference coordination response to the source base station, where the interference coordination response includes information about an air interface resource, the air interface resource is determined by the target base station and on which interference coordination is performed, and the air interface resource is used by a terminal device and the source base station to transmit a service.

With reference to the forty-ninth aspect, in a first possible implementation of the forty-ninth aspect, the interference coordination request includes quality of service information of the terminal device, and the air interface resource is determined by the target base station based on the quality of service information.

With reference to the forty-ninth aspect, in a second possible implementation of the forty-ninth aspect, the interference coordination request includes request information of the air interface resource, and the request information of the air interface resource is used to indicate information about an air interface resource on which the target base station is expected to perform interference coordination.

With reference to any one of the forty-ninth aspect, or the foregoing possible implementations of the forty-ninth aspect, in a third possible implementation of the forty-ninth aspect, that the receiving unit is configured to receive the interference coordination request sent by the source base station includes: the receiving unit is configured to receive, by using a controller, the interference coordination request sent by the source base station; and that the sending unit is configured to send the interference coordination response to the source base station includes: the sending unit is configured to send the interference coordination response to the source base station by using the controller.

With reference to any one of the forty-ninth aspect, or the first and second possible implementations of the forty-ninth aspect, in a fourth possible implementation of the forty-ninth aspect, that the receiving unit is configured to receive the interference coordination request sent by the source base station includes: the receiving unit is configured to receive, by using a source gateway and a target gateway, the interference coordination request sent by the source base station; and that the sending unit is configured to send the interference coordination response to the source base station includes: the sending unit is configured to send the interference coordination response to the source base station by using the source gateway and the target gateway.

According to a fiftieth aspect, the present patent application provides a terminal device, including: a sending unit, configured to send a measurement report to a source base station; and a receiving unit, configured to receive an interference coordination response, where the interference coordination response includes information about an air interface resource, the air interface resource is determined by a target base station and on which interference coordination is performed, and the air interface resource is used by the terminal device and the source base station to transmit a service.

With reference to the fiftieth aspect, in a first possible implementation of the fiftieth aspect, the measurement report includes information about supported service of the target base station.

According to a fifty-first aspect, the present patent application provides a gateway, including: a receiving unit, configured to receive an interference coordination request sent by a source base station; and a sending unit, configured to send the interference coordination request to a target gateway, where the receiving unit is further configured to receive an interference coordination response sent by the target gateway, for example, the interference coordination response includes information about an air interface resource, the air interface resource is determined by a target base station and on which interference coordination is performed, and the air interface resource is used by a terminal device and the source base station to transmit a service; and the sending unit is further configured to send the interference coordination response to the source base station.

According to a fifty-second aspect, the present patent application provides a gateway, including: a receiving unit, configured to receive an interference coordination request sent by a source gateway; and a sending unit, configured to send the interference coordination request to a target base station, where the receiving unit is further configured to receive an interference coordination response sent by the target base station, the interference coordination response includes information about an air interface resource, the air interface resource is determined by the target base station and on which interference coordination is performed, and the air interface resource is used by a terminal device and a source base station to transmit a service; and the sending unit is further configured to send the interference coordination response to the source gateway.

With reference to the fifty-first or fifty-second aspect, in a possible implementation, the interference coordination request further includes quality of service information of the terminal device, and the air interface resource is determined based on the quality of service information of the terminal device. In another possible implementation, the interference coordination request includes request information of the air interface resource, and the request information of the air interface resource is used to indicate information about an air interface resource on which the target base station is expected to perform interference coordination.

According to a fifty-third aspect, the present patent application provides a base station, including: a transceiver; a memory, configured to store an instruction; and a processor, connected to the memory and the transceiver, and configured to execute the instruction, so as to perform the following steps when executing the instruction: if a target base station does not support all services of a terminal device, instructing the transceiver to send an interference coordination request to the target base station; receiving, by using the transceiver, an interference coordination response sent by the target base station, where the interference coordination response includes information about an air interface resource, the air interface resource is determined by the target base station and on which interference coordination is performed, and the air interface resource is used by the terminal device and a source base station to transmit a service; and instructing the transceiver to send the interference coordination response to the terminal device.

With reference to the fitly-third aspect, in a first possible implementation of the fifty-third aspect, the interference coordination request includes quality of service information of the terminal device, and the air interface resource is determined by the target base station based on the quality of service information.

With reference to the fifty-third aspect, in a second possible implementation of the fifty-third aspect, the interference coordination request includes request information of the air interface resource, and the request information of the air interface resource is used to indicate information about an air interface resource on which the target base station is expected to perform interference coordination.

With reference to any one of the fifty-third aspect, or the foregoing possible implementations of the fifty-third aspect, in a third possible implementation of the fifty-third aspect, the processor further performs the following step when executing the instruction: receiving a measurement report of the terminal device by using the transceiver, where the measurement report includes information about supported service of the target base station.

With reference to any one of the fifty-third aspect, or the first to third possible implementations of the fifty-third aspect, in a fourth possible implementation of the fifty-third aspect, the processor further performs the following step when executing the instruction: receiving, by using the transceiver, the information that is sent by a controller or the target base station and that is about the at least one supported service of the target base station.

According to a fifty-fourth aspect, the present patent application provides a base station, including: a transceiver; a memory, configured to store an instruction; and a processor, connected to the memory and the transceiver, and configured to execute the instruction, so as to perform the following steps when executing the instruction: receiving, by using the transceiver, an interference coordination request from a source base station; and instructing the transceiver to send an interference coordination response to the source base station, where the interference coordination response includes information about an air interface resource, the air interface resource is determined by the target base station and on which interference coordination is performed, and the air interface resource is used by a terminal device and the source base station to transmit a service.

With reference to the fitly-fourth aspect, in a first possible implementation of the fifty-fourth aspect, the interference coordination request includes quality of service information of the terminal device, and the air interface resource is determined by the target base station based on the quality of service information.

With reference to the fifty-fourth aspect, in a second possible implementation of the fifty-fourth aspect, the interference coordination request includes request information of the air interface resource, and the request information of the air interface resource is used to indicate information about an air interface resource on which the target base station is expected to perform interference coordination.

According to a fifty-fifth aspect, the present patent application provides a terminal device, including: a transceiver; a memory, configured to store an instruction; and a processor, connected to the memory and the transceiver, and configured to execute the instruction, so as to perform the following steps when executing the instruction: instructing the transceiver to send a measurement report to a source base station; and receiving, by using the transceiver, an interference coordination response sent by the source base station, where the interference coordination response includes information about an air interface resource, the air interface resource is determined by a target base station and on which interference coordination is performed, and the air interface resource is used by the terminal device and the source base station to transmit a service.

With reference to the fifty-fifth aspect, in a first possible implementation of the fifty-fifth aspect, the measurement report includes information about supported service of the target base station.

In still another aspect, the present patent application provides a network system, including the base station in the eighth aspect and the base station in the ninth aspect. The network system may further include the gateway in the eleventh aspect. The network system may further include the gateway in the twelfth aspect. The network system may further include the gateway in the thirteenth aspect. The network system may further include the controller in the fourteenth aspect. The network system may further include the terminal device in the thirteenth aspect.

In still another aspect, the present patent application provides a network system, including the base station in the fifteenth aspect and the base station in the sixteenth aspect. The network system may further include the gateway in the eighteenth aspect. The network system may further include the gateway in the nineteenth aspect. The network system may further include the gateway in the twentieth aspect. The network system may further include the controller in the twenty-first aspect. The network system may further include the terminal device in the seventeenth aspect.

In still another aspect, the present patent application provides a network system, including the base station in the forty-eighth aspect and the base station in the forty-ninth aspect. The network system may further include the gateway in the fifty-first aspect. The network system may further include the gateway in the fifty-second aspect. The network system may further include the terminal device in the fiftieth aspect.

In still another aspect, the present patent application provides a computer storage medium, configured to store a computer software instruction used by the foregoing base station or terminal device or gateway or controller, where the computer software instruction includes programs used to perform the methods corresponding to the foregoing aspects.

DESCRIPTION OF EMBODIMENTS

Figure 1:
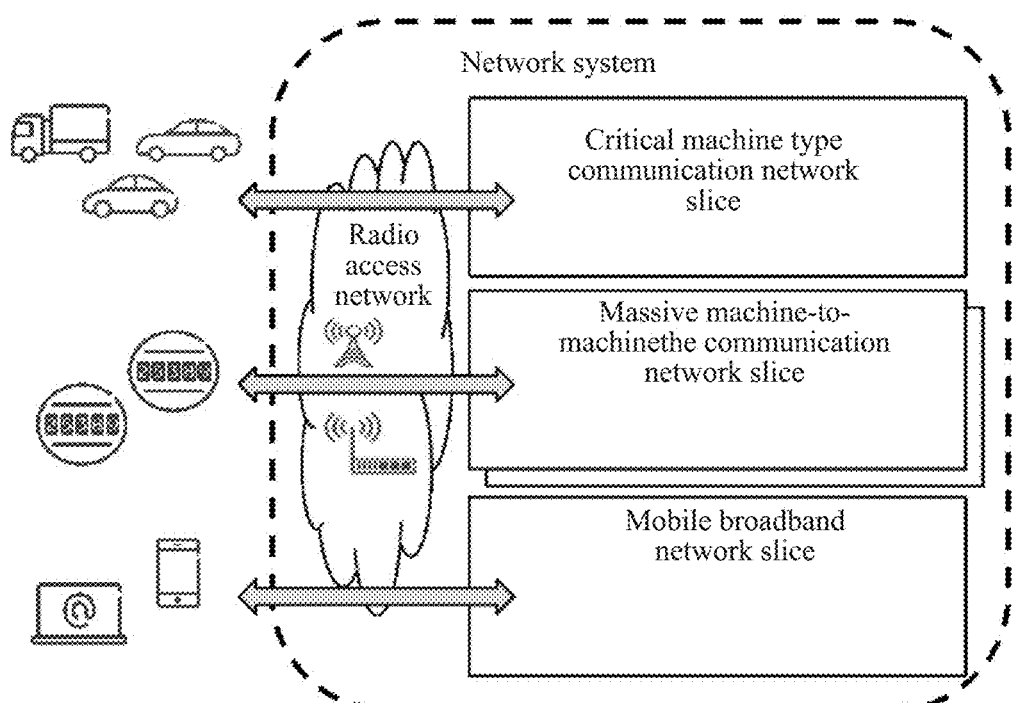
FIG. 1 is a schematic architectural diagram of a network slice.

Multiple embodiments are now described with reference to the accompanying drawings, and same components in this specification are indicated by a same reference numeral. In the following description, for ease of explanation, many specific details are provided to facilitate comprehensive understanding of one or more embodiments. However, apparently, the embodiments may either not be implemented by using these specific details. In other examples, a well-known structure and device are shown in a form of block diagrams, to conveniently describe one or more embodiments.

Terms such as "module" and "system" used in this specification are used to indicate computer-related entities, hardware, firmware, combinations of hardware and software, software, or software being executed. In addition, the embodiments are described with reference to a terminal device. The terminal device may also be referred to as a system, a terminal device unit, a terminal device station, a mobile station, a mobile station, a remote station, a remote terminal device, a mobile device, a wireless communications device, a terminal device agent, a terminal device apparatus or UE (User Equipment, terminal device). The terminal device may be a cellular phone, a cordless phone, a SIP (Session Initiation Protocol, Session Initiation Protocol) phone, a WLL (Wireless Local Loop, wireless local loop) station, a PDA (Personal Digital Assistant, personal digital assistant), a hand-held device having a wireless communication function, a computing device, or another processing device connected to a wireless modem.

In addition, the embodiments are described with reference to a base station. The base station can be used to communicate with a mobile device. The base station may be a BTS (Base Transceiver Station, base transceiver station) in GSM (Global System of Mobile Communication, Global System for Mobile Communications) or CDMA (Code Division Multiple Access, Code Division Multiple Access); or may be an NB (NodeB, NodeB) in WCDMA (Wideband Code Division Multiple Access, Wideband Code Division Multiple Access); or may be an eNB or eNodeB (Evolutional Node B, evolved NodeB) in LTE (Long Term Evolution, Long Term Evolution), a relay station or an access point, a base station device in a future network, or the like.

In addition, aspects or features of the present patent application may be implemented as a method, an apparatus or a product that uses standard programming and/or engineering technologies. The term "product" used in this application covers a computer program that can be accessed from any computer-readable device, carrier or medium. For example, the computer-readable medium may include but is not limited to: a magnetic storage component (for example, a hard disk, a floppy disk or a magnetic tape), an optical disc (for example, a CD (Compact Disk, compact disk) or a DVD (Digital Versatile Disk, digital versatile disk)), a smart card and a flash memory component (for example, an EPROM (Erasable Programmable Read-Only Memory, erasable programmable read-only memory), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

A network system shown in FIG. 1 includes a plurality of network slices isolated from each other. A terminal device communicates with the network slices by using a radio access network (radio access network, RAN). Each network slice includes a series of logical network functions to correspondingly satisfy differentiated requirements of different service types. For example, in a massive machine-to-machine communication (Massive M2M) network slice, massive connections of devices need to be satisfied, but a quality of service (Quality of Service, QoS) requirement of a network is not high. For another example, in a mobile broadband (Mobile Broadband, MBB) network slice, a high-bandwidth requirement needs to be satisfied to satisfy a requirement of providing a high service rate. For still another example, in a critical machine type communication (Critical Machine Type Communication) network slice, a network needs to provide an ultra-low latency, but does not have a high-bandwidth requirement.

In the future, sensor communication will be deployed in automobiles to provide unmanned driving. A latency needs to be strictly ensured, and critical machine type communication network slices may be used to provide services. Massively deployed water-meter reading sensors do not have a high QoS requirement, and massive machine-to-machine communication network slices may be used to provide services. High-definition video services on mobile phones require high bandwidths and high data rates, mobile broadband network slices may be used to provide services.

In a wireless communications system, different network slices cover different base stations. Herein, when a base station is covered by a network slice, the base station supports a service type corresponding to the network slice. In contrast, when a base station is not covered by a network slice, the base station does not support a service type corresponding to the network slice. In an actual communications system, some base stations support more service types corresponding to network slices, and some base stations support fewer service types corresponding to network slices.

One network slice is formed by a group of logical network functions used to support specific use cases. In a needed manner, the terminal device is guided to be connected to a correct slice. For example, a terminal device is guided to be connected to a correct slice based on subscription or a type of the terminal device.

Figure 2:
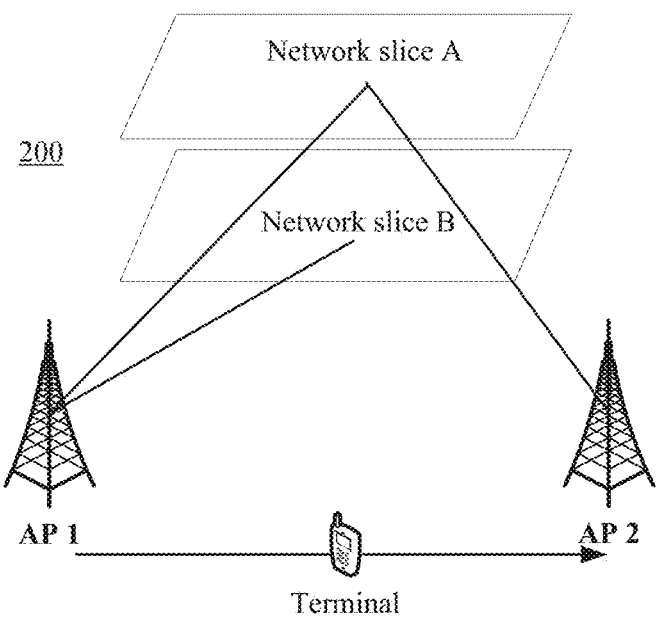
FIG. 2 is a schematic diagram of a wireless communications system according to an embodiment of the present patent application.

FIG. 2 shows a wireless communications system 200 according to the embodiments of this specification. The wireless communications system 200 includes a plurality of base stations. In FIG. 2, an example in which the wireless communications system 200 includes two base stations is used for description. The wireless communications system includes a base station AP 1 and a base station AP 2. The base station AP 1 and the base station AP 2 may be base stations of a same type. For example, the base station AP 1 and the base station AP 2 are both macro base stations or both micro base stations. The base station AP 1 and the base station AP 2 may alternatively be base stations of different types. For example, the base station AP 1 is a macro base station, and the base station A2 is a micro base station. In the wireless communications system 200. A network slice A may be a massive machine-to-machine communication network slice, and a network slice B is a mobile broadband network slice. The network slice includes a series of logical network functions to provide services of different types, so as to correspondingly satisfy differentiated requirements of different service types. The network slice A and the network slice B both cover the base station AP 1. The base station AP 1 may support transmission of both a massive M2M service and a mobile broadband service. The network slice A covers the base station AP 2, but the network slice B does not cover the base station AP 2. The base station AP 2 can only support transmission of a massive M2M service and does not support transmission of a mobile broadband service. The network slice B does not cover the base station AP 2 for several reasons. For example, there is no interface between the base station AP 2 and the network slice B. For another example, there is an interface but the network slice B is not instantiated. The foregoing only provides examples for describing a relationship between a base station and a network slice.

Figure 3:
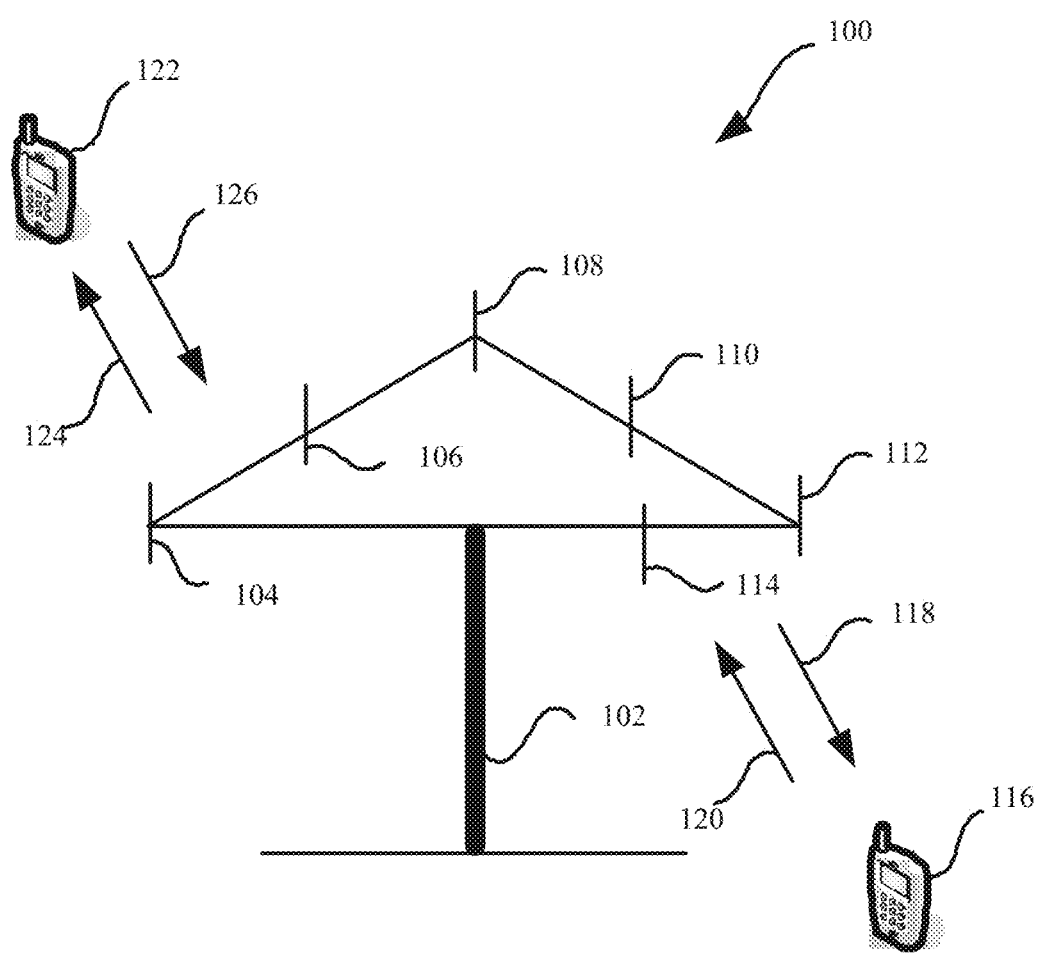
FIG. 3 is a schematic diagram of a base station according to another embodiment of the present patent application.

According to another embodiment of the present patent application, FIG. 3 is a schematic structural diagram of a base station. As shown in FIG. 3, the base station 102 may include a plurality of antenna groups. Each antenna group may include one or more antennas. For example, one antenna group may include antennas 104 and 106, another antenna group may include antennas 108 and 110, and an additional group may include antennas 112 and 114. In FIG. 3, two antennas are shown for each antenna group, however, more or fewer antennas may be used for each group. The base station 102 may additionally include a transmitter chain and a receiver chain, and a person of ordinary skill in the art may understand that both the transmitter chain and the receiver chain may include a plurality of components related to signal sending and receiving, for example, a processor, a modulator, a multiplexer, a demodulator, a demultiplexer, and an antenna.

The base station 102 may communicate with one or more terminal devices, for example, a terminal device 116 and a terminal device 122. However, it may be understood that the base station 102 may communicate with any quantity of terminal devices similar to the terminal device 116 or 122. As shown in the figure, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126. In a frequency division duplex (Frequency Division Duplex, FDD) system, for example, a frequency band different from that used by the reverse link 120 may be used for the forward link 118, and a frequency band different from that used by the reverse link 126 may be used for the forward link 124. In addition, in a time division duplex (Time Division Duplex, TDD) system, a common frequency band may be used for the forward link 118 and the reverse link 120, and a common frequency band may be used for the forward link 124 and the reverse link 126.

Each antenna group and/or an area designed for communication is referred to as a sector of the base station 102. For example, the antenna group may be designed to communicate with a terminal device in a sector of a coverage area of the base station 102. When the base station 102 communicates with the terminal devices 116 and 122 respectively by using the forward links 118 and 124, a transmit antenna of the base station 102 can improve signal-to-noise ratios of the forward links 118 and 124 through beamforming. In addition, compared with a manner in which a base station uses a single antenna to send signals to all terminal devices of the base station, when the base station 102 sends signals to the randomly scattered terminal devices 116 and 122 in related coverage areas through beamforming, mobile devices in neighboring cells are subject to less interference.

In a given time, the base station 102, the terminal device 116 or the terminal device 122 may be a wireless communications sending apparatus and/or a wireless communications receiving apparatus. When sending data, the wireless communications sending apparatus can encode the data for transmission. Specifically, the wireless communications sending apparatus can obtain, for example, generate, receive from another communications apparatus, or store in a memory, a particular quantity of data bits that need to be sent to the wireless communications receiving apparatus through a channel. Such data bits may be included in a transport block or a plurality of transport blocks of data, and the transport block may be segmented to generate a plurality of code blocks.

In a current network (2G/3G/4G), each base station supports transmission of all service types, and only strength of a reference signal between cells is considered during existing mobility management. If a reference signal received power of a target base station received by a terminal device is greater than a reference signal received power of a source base station, a user obtains better channel quality at the target base station than at the source base station, and the source base station sends a handover request. If the target base station has sufficient resources, the target base station allows access by the terminal device. However, in a network slicing architecture, it is possible that a target base station cannot support all service types of a terminal device. If an existing handover method is still used, after being handed over to the target base station, the terminal device cannot obtain a corresponding service, causing service interruption. Moreover, signaling generated during handover causes load to the system. In addition, during existing mobility management, only inter-cell handover is considered, and an inter-cell interference coordination technology is not considered.

Figure 4:
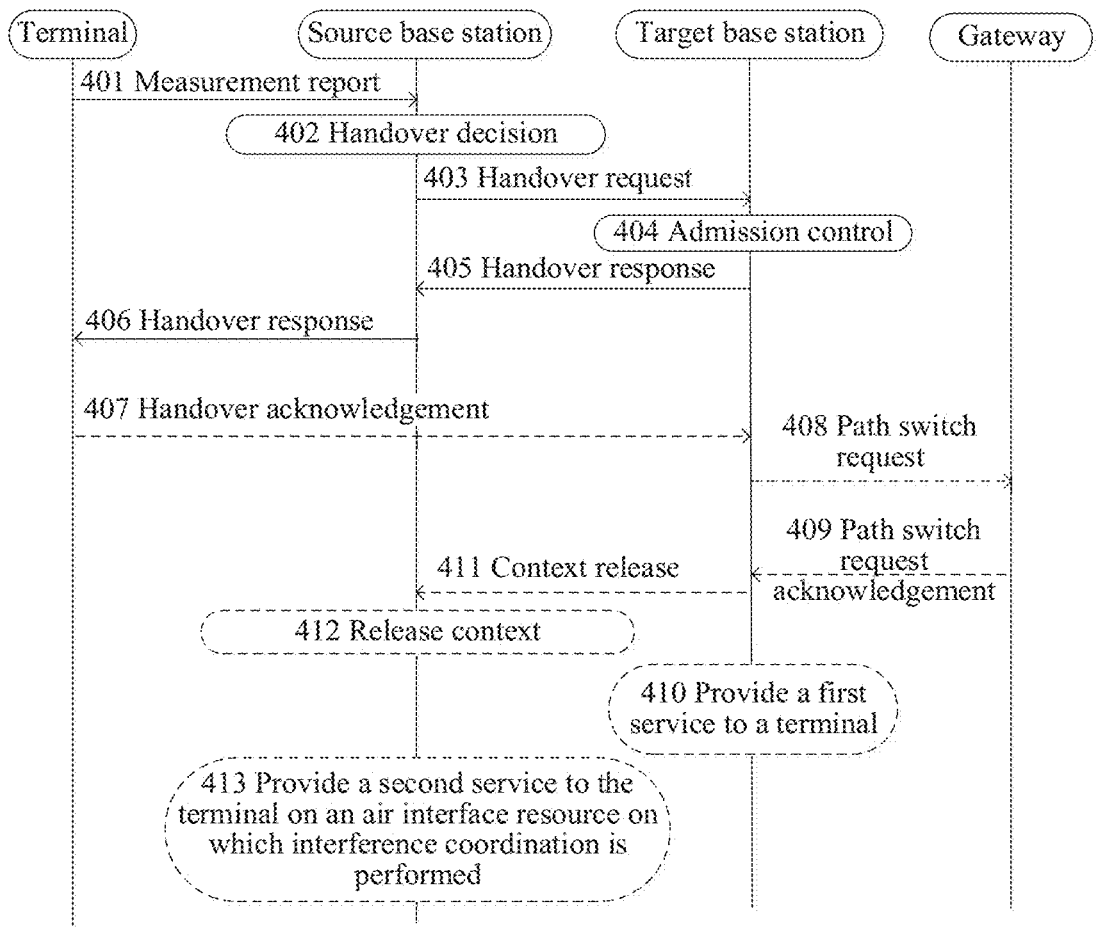
FIG. 4 is a schematic interactive diagram of a handover method according to another embodiment of the present patent application.

FIG. 4 is a schematic interactive diagram of a handover method according to an embodiment of the present patent application. As shown in FIG. 4, the communication method includes the following steps:

401: A terminal device sends a measurement report to a source base station. The source base station receives the measurement report sent by the terminal device.

402: The source base station performs handover decision. The source base station decides to send a handover request to a target base station. Handover decision performed by the source base station is further described below in detail.

403: The source base station sends the handover request to the target base station. The target base station receives the handover request. In this embodiment, in some cases, the handover request contains information about a first service of the terminal device. In some other embodiments, the handover request may further contain other information such as quality of service (Quality of Service, QoS) information of the terminal device. The handover request may further include information about the target base station. The information about the target base station may be an identifier (ID) of the target base station.

404: The target base station performs admission control after receiving the handover request. The admission control may be performed based on the information about the first service of the terminal device that is contained in the handover request and a service type or service types supported by the target base station. Admission control performed by the target base station is further described below in detail.

405: The target base station sends a handover response to the source base station. The handover response includes information about a handover instruction for the first service. The handover instruction is used to instruct the terminal device to hand over the first service to the target base station. The handover response may further contain information of the source base station. The information of the source base station may be an identifier (ID) of the source base station.

406: The source base station sends a handover response to the terminal device. The terminal device receives the handover response sent by the source base station.

407: The terminal device sends a handover acknowledgement to the target base station.

408: The target base station sends a path switch request to a gateway. The gateway receives the path switch request. The path switch request includes the information about first service. The path switch request is used to notify the gateway that the first service of the terminal device has been handed over to the target base station. The gateway switches a path on a core network side of the first service of the terminal device to the target base station.

409: The gateway sends a path switch request acknowledgement to the target base station. The target base station receives the path switch request acknowledgement. The path switch request acknowledgement is a feedback for the path switch request, and is used to notify the target base station that switching of uplink and downlink paths on the core network side of the first service of the terminal device has been completed.

410: The target base station provides the first service of the terminal device.

In 401, the measurement report may contain information about at least one supported service of the target base station for the terminal device. The service support information may be in a status manner. For example, two bit identifiers are used to represent that the target base station supports all, some, or none of service types of the terminal device. Such processing is simple and has low overheads. Alternatively, a plurality of bit identifiers are used to represent information about a supported service type of the target base station. Such processing is more precise. The information about service support of the target base station for the terminal device may be obtained by using broadcast information of the target base station. The source base station may further obtain, in another manner, the information about the supported service type of the target base station. Details are further provided below.

Figure 5:
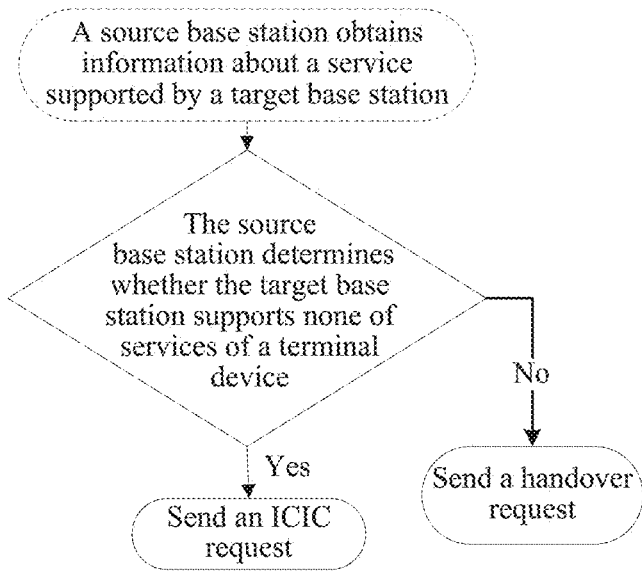
FIG. 5 is a schematic diagram of a source base station performing handover decision according to another embodiment of the present patent application.

FIG. 5 is a schematic flowchart of the source base station performing handover decision in 402. The source base station needs to perform handover decision based on the supported service type of the target base station. As shown in FIG. 5, after obtaining the service type supported by the target base station, the source base station determines whether the target base station supports non of services of the terminal device. If the target base station can support at least one service of the terminal device, the source base station sends a handover request to the target base station. If the target base station cannot support any service of the terminal device, the source base station sends an inter-cell interference coordination (inter-cell interference coordination, ICIC) request to the target base station. The source base station may further perform handover decision based on the measurement report and radio resource management (radio resource management, RRM) information.

It should be noted that if the source base station determines that the target base station supports the service type of the terminal device, the information about the service included in the handover request message sent by the source base station to the target base station could be avoided. The target base station does not need to consider service type information during admission control, and only considers a resource status of the target base station. If the target base station has a resource, a handover response sent by the target base station to the source base station includes information about a handover instruction. The handover instruction is used to instruct to hand over all service types of the terminal device to the target base station. If the target base station has no resource, a handover response sent by the target base station to the source base station includes information of rejecting handover.

If service types are corresponding to network slices in a one-to-one manner, information about service in a handover request may be a network slice identifier (ID). In other cases, the information about service may be an independent information and may have a correspondence with a network slice ID.

In 404, a form of the handover instruction for the first service may be a first service identifier (ID) and a flag of the handover instruction.

Optionally, in 405, the handover response may further include a cell-radio network temporary identifier (Cell-Radio Network Temporary Identifier, C-RNTI) of the terminal device in the target base station, a security algorithm of the target base station, and a dedicated random-access preamble (Random-access Channel Preamble).

Steps 407 to 410 are performed only in case that at least one service is handed over to the target base station.

Step 407 may include the following substeps:

The terminal device sends a synchronization request to the target base station. The target base station receives the synchronization request.

The target base station sends uplink allocation information and timing advance (Timing Advance, TA) information to the terminal device. The terminal device receives the uplink allocation information and the TA information. The uplink allocation information includes information used by the terminal device to send uplink data. The TA information is used by the terminal device to perform time adjustment.

After being successfully connected to the target base station, the terminal device sends the handover acknowledgement to the target base station. The target base station receives the handover acknowledgement. The handover acknowledgement includes a message of the C-RNTI. The target base station may confirm, by using the C-RNTI, that the user is a user that is handed over.

In this embodiment, if all the services of the terminal device are handed over to the target base station, the foregoing method may further include the following steps:

411: The target base station sends UE context release information to the source base station. The source base station receives the UE context release information. The UE context release information is used to notify the source base station that the terminal device has been handed over to the target base station and trigger the source base station to release an air interface resource. Step 411 only needs to be performed after step 409.

412: The source base station releases context information of the terminal device.

If some of the services of the terminal device are handed over to the target base station, when the terminal device can be connected to only one base station at a same moment, the foregoing method may further include steps 411 and 412.

Because of mobility, a terminal device may move from a source base station supporting all service types of the terminal device to a target base station that does not support all the service types of the terminal device. In a possible processing manner, a service of a service type that the target base station does not support is interrupted for the terminal device. However, this causes a service interruption problem. This case is considered in the present patent application, and inter-cell interference coordination can be used for a service type that is not supported by the target base station. This case is further described below in detail.

In 403, the handover request may contain information about a second service of the terminal device. Certainly, the handover request may further contain other information, for example, QoS information of the second service of the terminal device.

In 404, if the second service is not supported by the target base station, when the target base station has air interface resources on which interference coordination can be performed, the handover response sent by the target base station to the source base station contains information about an air interface resource of the second service, the air interface resource is determined by the target base station and on which interference coordination is performed. The information about the air interface resource is used to instruct the source base station to provide the second service to the terminal device on the air interface resource.

In 405, the handover response correspondingly contains the information about the air interface resource of the second service.

In this case, the handover method may further include: 413, the source base station provides the second service to the terminal device on the air interface resource on which interference coordination is performed. This step only needs to be performed after 406.

For the second service of the terminal device, a core network path does not need to be switched for the second service. When the source base station still provides the second service to the terminal device, 411 and 412 do not need to be performed.

In 404, that the target base station has the air interface resources on which interference coordination can be performed includes: the target base station has idle air interface resources on which interference coordination can be performed. In another case, if the target base station is providing a latency insensitive service and the terminal device is a latency sensitive user, the target base station may allocate, to the terminal device, air interface resources that are originally used for providing the latency insensitive service in a cell, to perform interference coordination. These air interface resources may be air interface resources on which interference coordination can be performed.

Figure 7:
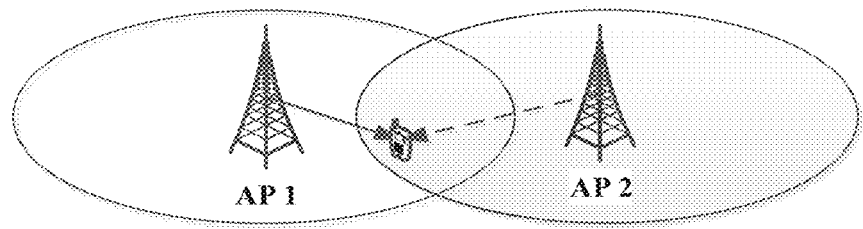
FIG. 7 is a schematic interactive diagram of a handover method according to another embodiment of the present patent application.

The inter-cell interference coordination is a technology of managing wireless air interface resources to implement inter-cell interference control. Specifically, as shown in FIG. 7, an interference base station, for example, an AP 2, performs transmission by using a power less than a preset value or does not perform transmission on some air interface resources. An interfered—with base station, for example, an AP 1, schedules a terminal device near the interference base station on the air interface resources, so as to reduce inter-cell interference from the interference base station to the terminal device. A power of the preset value may be a normal transmit power. In this case, during interference coordination, transmission is performed by using a power less than the normal transmit power or transmission is not performed on the air interface resources.

An air interface resource includes a time resource and/or a frequency resource. For example, in an LTE system, the air interface resource includes a plurality of resource blocks (Resource Block, RB). Each RB is corresponding to one timeslot (slot) in a time domain, and is corresponding to 12 continuous subcarriers in a frequency domain. For an air interface resource in this form, information about the air interface resource may indicate a plurality of RB blocks, and the information about the air interface resource may be extended in the time domain to indicate, for example, N slots and 12 continuous subcarriers, or may be extended in the frequency domain to indicate, for example, one slot and 12*M subcarriers, or may be simultaneously extended in both the time domain and the frequency domain to indicate, for example, N slots and 12*M subcarriers. N and M are positive integers greater than 0. Certainly, in a future communications system, the air interface resource may further be embodied in other forms.

If the handover request contains the QoS information of the second service of the terminal device, the target base station calculates, based on the QoS information, a quantity of air interface resources needed to satisfy a QoS requirement of the terminal device, and then chooses corresponding air interface resources. In this way, air interface resources can be dynamically determined, and utilization of the air interface resources is high. If a manner of reserving air interface resources is used, there may be two results: air interface resources are insufficient or air interface resources are excessive. When air interface resources are insufficient, reserved air interface resources are not sufficient to satisfy a QoS requirement of the terminal device. When air interface resources are excessive, a quantity of reserved air interface resources is greater than a quantity of air interface resources for satisfying a QoS requirement of the terminal device. The target base station cannot perform transmission on the reserved air interface resources, resulting in a waste of air interface resources.

Figure 6:
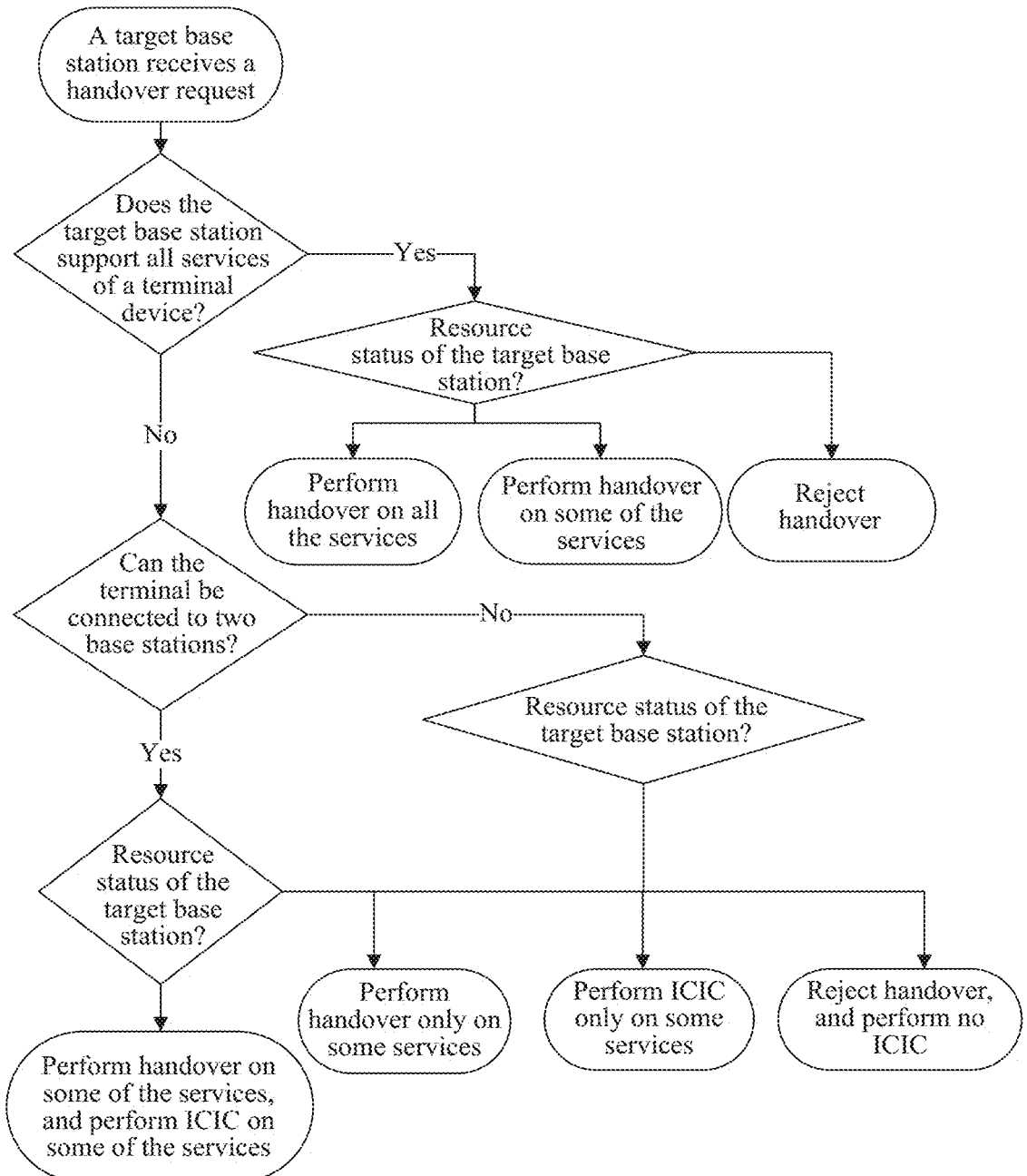
FIG. 6 is a schematic diagram of a target base station performing admission control according to another embodiment of the present patent application.

FIG. 6 is a schematic flowchart of a target base station performing admission control. If a handover request contains a service type of a terminal device, the target base station needs to perform admission control depending on whether the service type of the terminal device is supported. As shown in FIG. 6, after receiving a handover request, the target base station determines whether the target base station supports all service types of a terminal device. If the target base station supports all the service types of the terminal device and the target base station has sufficient resources, a handover response sent by the target base station contains information about a handover instruction for all services. The information instructs the terminal device to hand over all the services from a source base station to the target base station. If the target base station does not have sufficient resources to serve the terminal device, a handover response sent by the target base station to a source base station contains information of rejecting handover or information about handover of at least one service of all the services.

If the target base station does not support all the service types of the terminal device, it means that the target base station supports some service types of the terminal device.

If the terminal device can be simultaneously connected to two base stations, a resource status of the target base station may be considered. When the target base station has sufficient resources to simultaneously perform handover and ICIC, the target base station performs handover on a supported service and perform ICIC on a service that is not supported. When the target base station has some resources that can only be used to perform handover or perform ICIC, a priority of a service type is considered. If supported service of the target base station has a relatively high priority, the target base station only performs handover on the supported service. If a service that the target base station does not support has a relatively high priority, the target base station only performs ICIC on the service that the target base station does not support. When the target base station has no resources, the target base station performs neither handover nor ICIC.

If the terminal device cannot be simultaneously connected to two base stations, a resource status of the target base station may be considered. When the target base station has sufficient resources, a priority of a service type is considered. If supported service of the target base station has a relatively high priority, the target base station only performs handover on the supported service. If a service that the target base station does not support has a relatively high priority, the target base station only performs ICIC on the service that the target base station does not support. When the target base station has no resources, the target base station performs neither handover nor ICIC.

Based on these several cases, the handover response contains varied information. If the target base station performs handover on supported service of the target base station, the handover response contains a handover instruction for the service. If the target base station performs ICIC on a service that the target base station does not support, the handover response contains an indication of an air interface resource of the service. If the target base station rejects handover, the handover response contains information of rejecting handover.

A handover request contains a service type, so that the target base station can accurately perform admission control and determine whether the target base station needs to accept a handover. A service interruption probability of a terminal device is reduced. An existing handover request does not contain service type information. When the target base station has a resource, even if the target base station cannot provide services of some service types, the target base station should admit to serve the user during admission control. However, after handover, the target base station cannot provide a service of a corresponding type. As a result, service interruption occurs because of inaccurate admission control. However, in the present patent application, a handover request contains a service type. During admission control, the target base station may know whether the target base station supports a current service of a user. The target base station admit to serve the user if the target base station has resources and supports all current services of the user. In this way, service interruption can be avoided. In a scenario of a network slice, a handover request contains a service type, and the target base station considers a service type during admission control. In this way, a service interruption problem caused by mobility of a terminal device can be resolved to some extent. Further, the source base station also considers a service type during handover decision. The source base station sends a handover request to the target base station only when the target base station supports at least some service types of the terminal device. The source base station no longer sends a handover request when the target base station supports none of services of the source base station, so that inter-system signaling interaction is reduced.

FIG. 2 is used as an example. Referring to this embodiment, if the target base station is an AP 2, the AP 2 supports a service type corresponding to a network slice A but does not support a service type corresponding to a network slice B. In this case, a second service corresponding to the network slice B continues to reside in the source base station. A first service corresponding to the network slice A may be handed over to the target base station.

In conventional mobility handover, after handover is completed, the source base station releases context information of a terminal device and an air interface resource allocated to the terminal device. In this embodiment, after handover is completed, the source base station determines, based on a specific condition, whether to release the context information of the terminal device. If the source base station still needs to provide a second service to the terminal device, the context information of the terminal device may be reserved. If the source base station does not need to provide any service to the terminal device, the context information of the terminal device may be released.

During mobility management of the present patent application, if ICIC is performed, the terminal device still resides in the source base station, and specifically services are provided to the terminal device on some air interface resources. The target base station performs transmission by using a power less than a normal transmit power or does not perform transmission on the air interface resources. In this way, the source base station is subject to less interference, and a service interruption problem is avoided to some extent, so that an interruption probability caused by mobility of a terminal device is reduced. In addition, the terminal device resides in the source base station and does not necessarily need to be handed over to the target base station, so that a quantity of handovers is reduced.

Further analysis is provided below with reference to a more specific scenario. In the specific scenario, a source base station and a target base station may be respectively macro base stations or micro base stations. A macro base station has a relatively large coverage radius that is usually approximately 500 m to 1500 m. A micro base station is usually a base station that has a relatively small transmit power and that is repeatedly deployed within a coverage area of a macro base station to resolve a traffic requirement or a coverage hole in a hotspot area, and usually has a coverage radius of approximately tens of meters.

It is assumed that the source base station is a macro base station and the target base station is a micro base station within a coverage area of the source base station. The target base station does not support all services of a terminal device. In this case, as the terminal device approaches the target base station and leaves the target base station, when the solution is used, the terminal device may remain residing in the source base station to obtain desirable services without needing handover, so that a quantity of handovers is reduced. In a conventional solution, because the target base station does not support all the services of the terminal device, the target base station refuses, during handover, to accept a service that the target base station does not support. Moreover, due to interference from the target base station to the source base station as the terminal device moves to the target base station, the source base station cannot provide services to the terminal device, resulting in service interruption of the terminal device.

If the target base station and the source base station are both macro base stations, or the target base station and the source base station are both micro base stations, or the source base station is a micro base station and the target base station is a macro base station, because the target base station performs transmission by using a power less than a normal transmit power on an air interface resource or does not perform transmission on an air interface resource, interference to the source base station is reduced. Compared with an existing solution, in this application, the source base station can provide services to a terminal device for a longer time. In this prolonged time, a service of the terminal device may have been transmitted, or even if the service has not been transmitted, a time that the network provides a service to the terminal device can be prolonged, so that the service can be interrupted later. This improves service experience of the terminal device.

In the present patent application, the source base station initiates handover, and the terminal device does not need to be changed. In addition, a Radio Air Interface Resource Control (Radio Resource Control, RRC) link, random access, and synchronization do not need to be established in a scenario in which the terminal device cannot be handed over to the target base station, so that random-access air interface resources are saved.

In the present patent application, if the target base station has no air interface resource to perform handover, and the target base station has no air interface resource for interference coordination, for example, the target base station is fully loaded, the target base station decides to reject handover and does not perform interference coordination on the terminal device. In this case, the handover response sent by the target base station to the source base station contains failure information.

Figure 8:
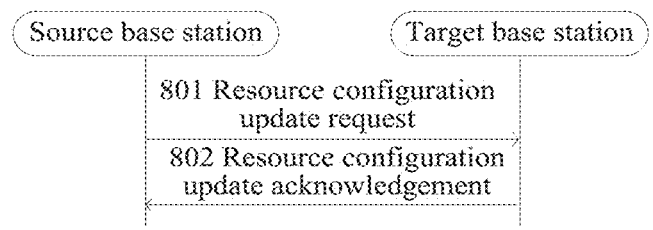
FIG. 8 is a schematic interactive diagram of updating a resource configuration according to another embodiment of the present patent application.

FIG. 8 is a schematic interactive diagram of a handover method according to another embodiment of the present patent application. As shown in FIG. 8, the communication method includes the following steps:

801: When a terminal device finishes communication with a source base station or a terminal device leaves a coverage area of a target base station, the source base station sends an air interface resource configuration update request to the target base station. The air interface resource configuration update request contains information about an air interface resource. The information about the air interface resource in the air interface resource configuration update request is used to indicate that the target base station does not need to perform interference coordination on the air interface resource.

802: The target base station receives the air interface resource configuration update request. The target base station no longer performs interference coordination on the air interface resource. The target base station sends an air interface resource configuration update acknowledgement to the source base station. The source base station receives the air interface resource configuration update acknowledgement sent by the target base station. The air interface resource configuration update acknowledgement is used to indicate that the target base station no longer performs interference coordination on the air interface resource.

In the present patent application, after the terminal device has left or the terminal device finishes communication with the source base station, the target base station is notified that no interference coordination needs to be performed on the air interface resource. The target base station may reuse the air interface resource to provide a service to a terminal device within the coverage area of target base station, thereby improving utilization of air interface resources.

Figure 9:
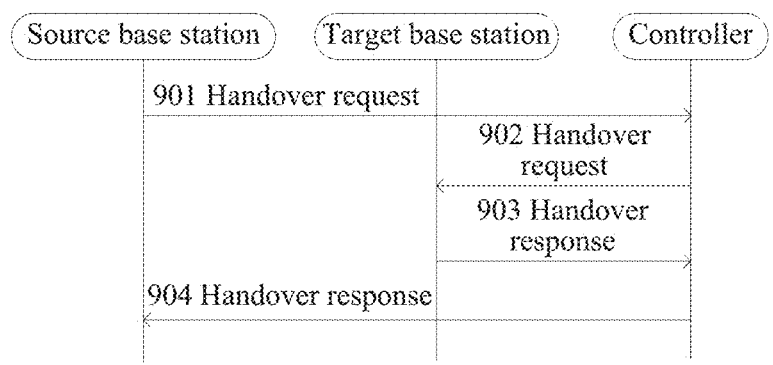
FIG. 9 is a schematic interactive diagram of a handover method according to another embodiment of the present patent application.

FIG. 9 is a schematic interactive diagram of a handover method according to another embodiment of the present patent application. In the embodiment shown in FIG. 4, the source base station and the target base station directly transfer handover signaling. In this embodiment, a source base station and a target base station forward handover signaling by using a controller. A handover request and a handover response in this embodiment may replace the handover request and the handover response between the source base station and the target base station in FIG. 4. As shown in FIG. 9, the communication method includes the following steps:

901: The source base station sends a handover request to the controller. The controller receives the handover request. The controller may be a network slice controller or a controller in another form, for example, a mobility management entity (mobility management entity, MME), a gateway, or another type of controller. In this embodiment, the handover request contains information about service of a terminal device and information about the target base station. The information about the target base station may be a target base station list or an identifier (identifier, ID) of a specific target base station. The information about the target base station may be obtained through interaction between the base stations or obtained by using a core network.

902: The controller sends a handover request to the target base station based on the information about the target base station after receiving the handover request. The target base station receives the handover request. If the information about the target base station is the target base station list, the controller selects one target base station and sends the handover request to the target base station. The controller may select one target base station from a perspective of utility optimization based on network conditions known by the controller, for example, load of base stations, and service types supported by the base stations. For example, a target base station having lowest load, a target base station Whose supported service type is closest to a service type of the terminal device, or a target base station that has lowest load and whose supported service type is closest to a service type of the terminal device is selected from the target base station list. If the information about the target base station is the identifier of the target base station, the controller sends the handover request to the target base station corresponding to the identifier of the target base station.

903: The target base station sends a handover response to the controller. The controller receives the handover response.

904: The controller sends a handover response to the source base station. The source base station receives the handover response.

If there is no interface between the base stations or a handover request fails to be directly sent between the base stations, this embodiment may be used to complete handover.

Figure 10:
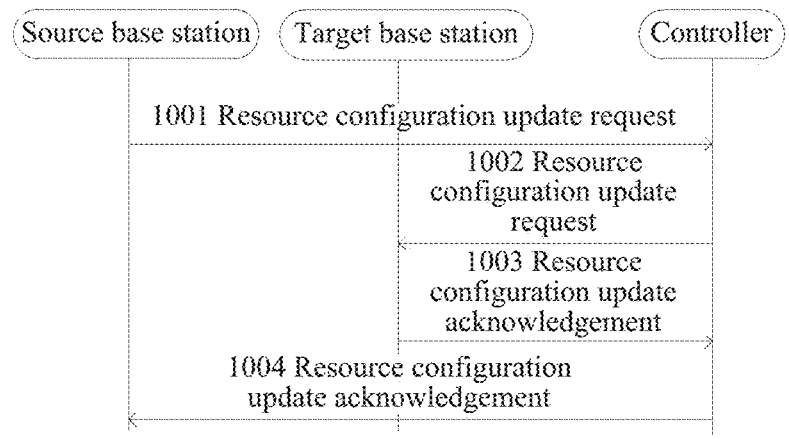
FIG. 10 is a schematic interactive diagram of updating a resource configuration according to another embodiment of the present patent application.

FIG. 10 is a schematic interactive diagram of a handover method according to another embodiment of the present patent application. In the embodiment shown in FIG. 8, the source base station and the target base station directly transfer signaling about an air interface resource configuration. In this embodiment, a source base station and a target base station forward signaling about an air interface resource configuration by using a controller. As shown in FIG. 10, the communication method includes the following steps:

1001: The source base station sends an air interface resource configuration update request to the controller. The controller receives the air interface resource configuration update request. The air interface resource configuration update request contains information about an air interface resource and information about the target base station.

1002: The controller sends the air interface resource configuration update request to the target base station. The air interface resource configuration update request contains the information about the air interface resource. The target base station receives the air interface resource configuration update request. The target base station no longer performs interference coordination.

1003: The target base station sends an air interface resource configuration update acknowledgement to the controller. The controller receives the air interface resource configuration update acknowledgement. The air interface resource configuration update acknowledgement is used to indicate that the target base station no longer performs interference coordination on the air interface resource.

1004: The controller sends the air interface resource configuration update acknowledgement to the source base station. The source base station receives the air interface resource configuration update acknowledgement sent by the controller.

If there is no interface between the base stations or an air interface resource configuration fails to be directly updated between the base stations, this embodiment may be used to complete air interface resource configuration update.

If ICIC is performed in the embodiments, the embodiments may further be combined with the embodiment shown in FIG. 8 or FIG. 10.

Figure 11:
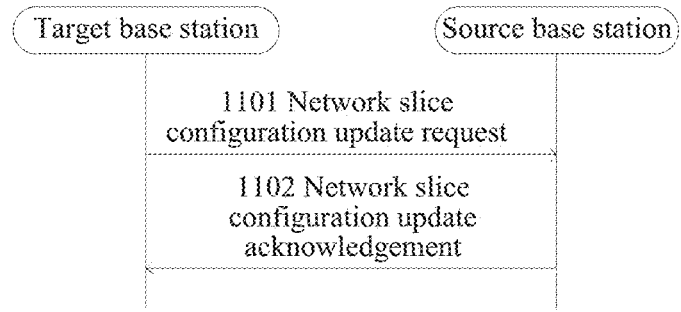
FIG. 11 is a schematic interactive diagram of updating a network slice configuration according to another embodiment of the present patent application.

FIG. 11 is a schematic interactive diagram of base stations when a source base station obtains a supported service type of a target base station according to an embodiment of the present patent application. As shown in FIG. 11, the handover method may include the following steps:

1101: The target base station sends a network slice configuration update request to the source base station. The source base station receives the network slice configuration update request. The network slice configuration update request contains the supported service type of the target base station.

1102: After receiving the network slice configuration update request sent by the target base station, the source base station saves the supported service type of the target base station, and sends network slice configuration update acknowledgement signaling to the target base station.

A network slice configuration update request may be initiated by any base station, not limited to being initiated by the target base station to the source base station. When being covered by a new network slice, the target base station may initiate a network slice configuration update request to the source base station.

Figure 12:
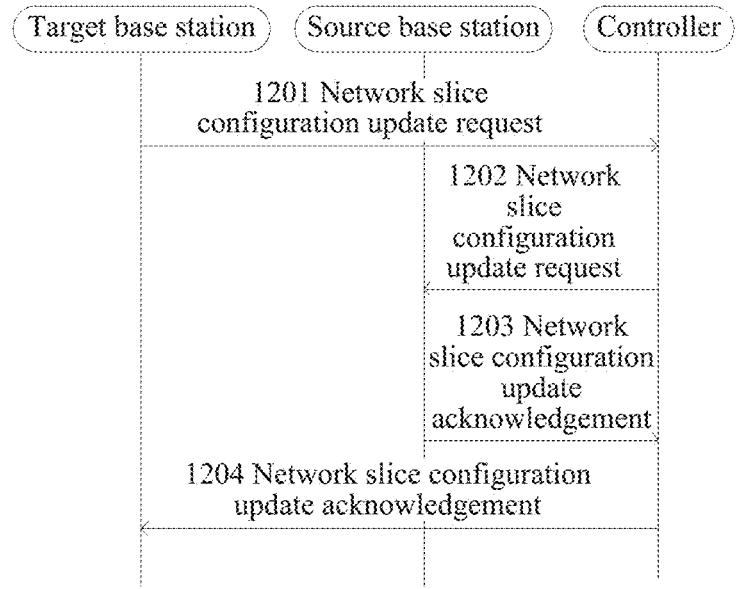
FIG. 12 is a schematic interactive diagram of updating a network slice configuration according to another embodiment of the present patent application.

FIG. 12 is another schematic interactive diagram of base stations, so that a source base station obtains a supported service type of a target base station. Specifically, the handover method may further include the following steps:

1201: The target base station sends a network slice configuration update request to a controller. The controller receives the network slice configuration update request.

1202: After receiving the network slice configuration update request, the controller sends the network slice configuration update request to the source base station. The source base station receives the network slice configuration update request.

1203: After receiving the network slice configuration update request sent by the target base station, the source base station saves the supported service type of the target base station, and sends network slice configuration update acknowledgement signaling to the controller. The controller receives the network slice configuration update acknowledgement signaling.

1204: After receiving the network slice configuration update acknowledgement signaling, the controller sends the network slice configuration update acknowledgement signaling to the source base station.

If there is no interface between the base stations or a network slice configuration fails to be directly updated between the base stations, this embodiment may be used to complete network slice configuration update.

Figure 13:
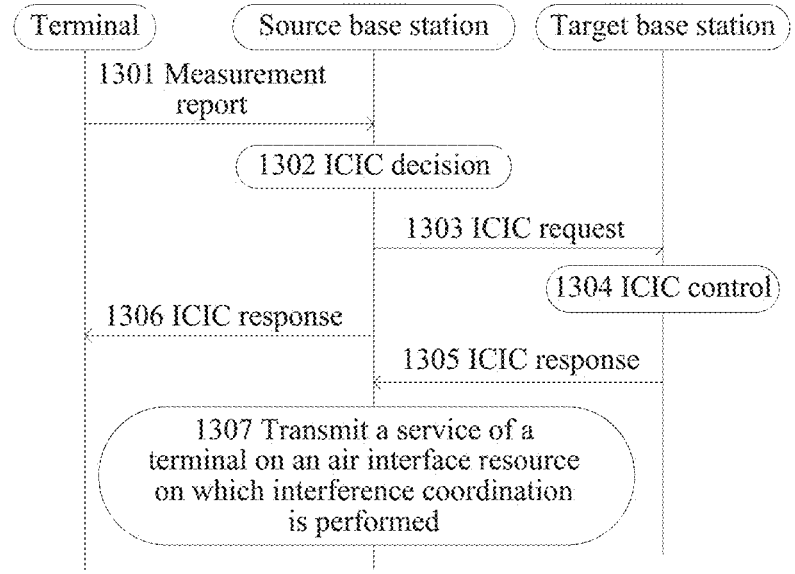
FIG. 13 is a schematic interactive diagram of inter-cell interference coordination according to another embodiment of the present patent application.

FIG. 13 is a schematic interactive diagram of an inter-cell interference coordination method according to another embodiment of the present patent application. In this embodiment, a source base station finds that a target base station does not support all service types of a terminal device. In this case, the source base station directly sends an ICIC request to the target base station to request the target base station to perform interference coordination on the terminal device. As shown in FIG. 13, the communication method includes the following steps:

1301 is basically the same as 401.

1302: The source base station performs ICIC decision. The source base station decides to send the ICIC request to the target base station.

1303: The source base station sends the ICIC request to the target base station, and the target base station receives the ICIC request. In a case, the ICIC request may contain interference coordination information. The interference coordination information includes information about an air interface resource that is needed by the source base station and on which inter-cell interference coordination is performed. The information about the resource may be specifically a time frequency resource block of the inter-cell interference coordination, or may be a size of a needed time frequency resource block on which inter-cell interference coordination is performed, or may be in another form. The ICIC request may contain QoS information of the terminal device. After receiving the QoS information, the target base station determines a needed air interface resource based on the QoS information. Refer to the foregoing description.

1304: The target base station performs ICIC control after receiving the ICIC request. If the target base station has an idle air interface resource for interference coordination, an ICIC response sent by the target base station to the source base station contains information about an air interface resource. The information about the air interface resource is used to indicate that the target base station performs ICIC on the air interface resource.

1305: The target base station sends the ICIC response to the source base station. The source base station receives the ICIC response. The ICIC response contains the information about the air interface resource.

1306: The source base station sends the ICIC response to the terminal device. The terminal device receives the ICIC response.

1307 is basically the same as 413.

In 1302, ICIC decision is triggered by a single measurement report of the terminal device. The measurement report is sent as the terminal device moves. Optionally, in 1303, the ICIC request may further contain information about a first service of the terminal device. Correspondingly, in 1304, when the target base station does not have an idle air interface resource for interference coordination, the target base station needs to consider the first service of the terminal. If a priority of the first service is higher than that of a service currently provided by the target base station, the ICIC response sent by the target base station to the source base station contains information about an air interface resource. If a priority of the first service is not higher than that of a service currently provided by the target base station, the ICIC response sent by the target base station to the source base station contains information of rejecting ICIC.

Figure 14:
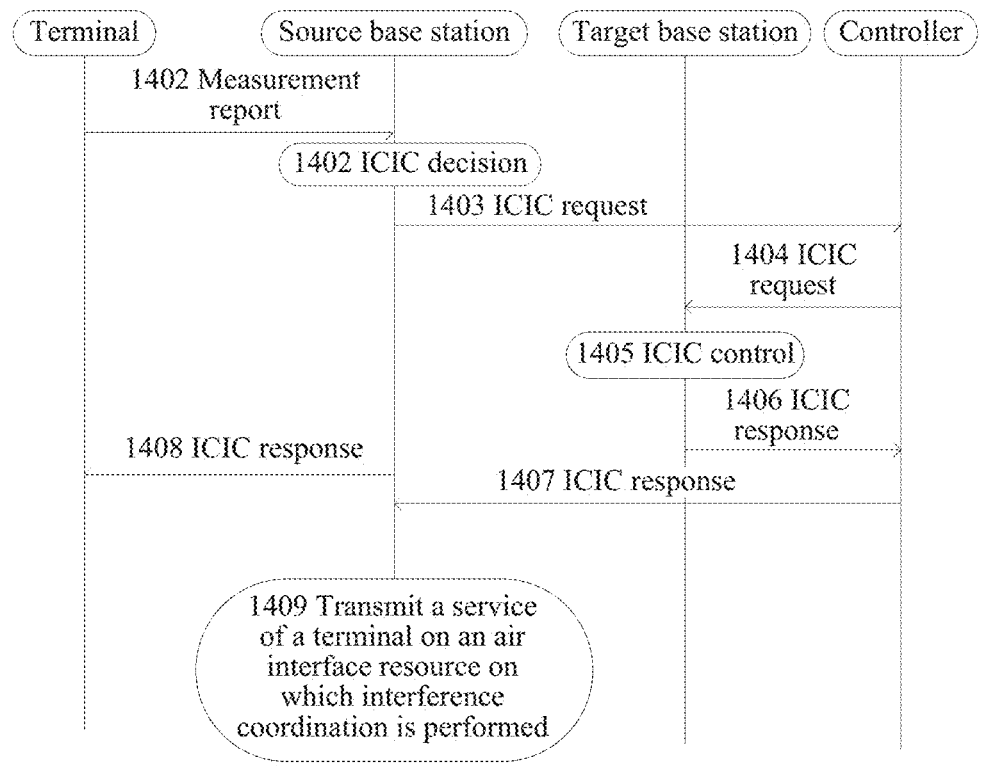
FIG. 14 is a schematic interactive diagram of inter-cell interference coordination according to another embodiment of the present patent application.

Conventional ICIC in LTE is usually periodically triggered or triggered based on statistical information. The statistical information may be a change of a quantity of edge users. In the present patent application, the measurement report is triggered during the movement of the terminal. The source base station needs to consider a service type when performing handover decision. If the target base station does not support all services of the terminal device, the source base station decides to send the ICIC request to the target base station:

FIG. 14 is a schematic interactive diagram of an inter-cell interference coordination method according to another embodiment of the present patent application. In this embodiment, a source base station and a target base station forward handover signaling by using a controller. As shown in FIG. 14, the communication method includes the following steps:

1401 is basically the same as 1301.

1402 is basically the same as 1302.

1403: The source base station sends the ICIC request to the controller. The controller receives the ICIC request. The ICIC request may contain interference coordination information. Refer to the foregoing description for the interference coordination information. In this embodiment, a handover request further needs to contain information about the target base station. The information about the target base station may be a target base station list or an ID of a specific target base station. Refer to the foregoing description for the information about the target base station.

1404: The controller sends the ICIC request to the target base station based on the information about the target base station after receiving the ICIC request. The target base station receives the handover request: Refer to the foregoing description for selection of a target base station based on the information about the target base station.

1405 is basically the same as 1304.

1406: The target base station sends a handover response to the controller, and the controller receives the handover response.

1407: The controller sends the handover response to the source base station. The source base station receives the handover response.

1408 and 1409 are basically the same as 1306 and 1307.

Figure 15:
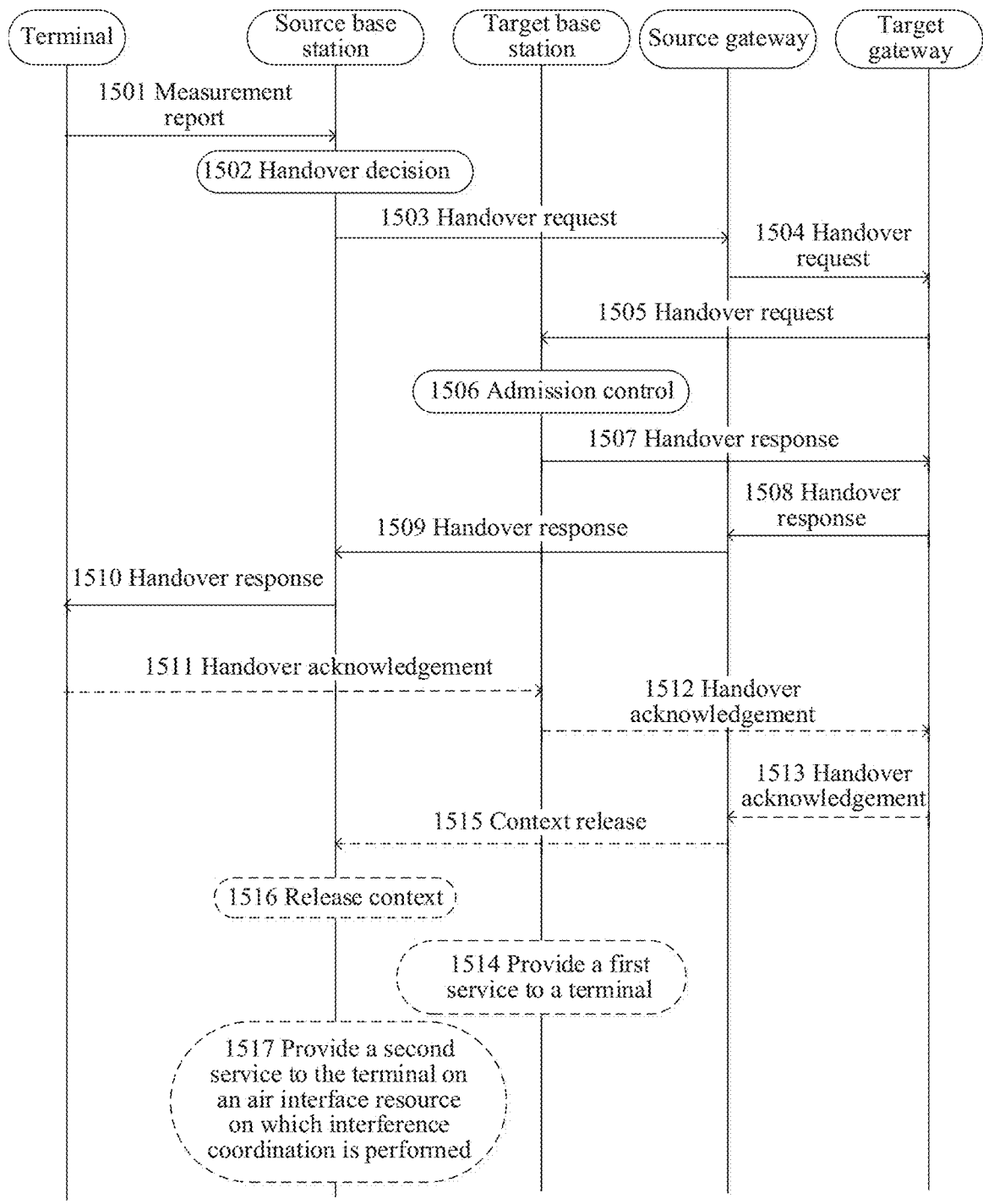
FIG. 15 is a schematic interactive diagram of a handover method according to another embodiment of the present patent application.

The source base station and the target base station may be administrated by different gateways. Mobility management of the terminal device in this case is further described below. If direct handover between the source base station and the target base station fails, the following embodiment may be used. FIG. 15 is a schematic interactive diagram of a handover method according to another embodiment of the present patent application. The embodiment shown in FIG. 15 and the embodiment in FIG. 4 have similar application scenarios. The same or similar parts are no longer described in detail. As shown in FIG. 15, the communication method includes the following steps:

1501 is basically the same as 401.

1502 is similar to 402, and the source base station decides to send a handover request to a source gateway.

1503: The source base station sends the handover request to the source gateway. The source gateway receives the handover request. The handover request further includes a tracking area identifier used to assist the source gateway in selecting a suitable target gateway.

1504: The source gateway selects a target gateway based on the tracking area identifier. The source gateway sends a handover request to the target gateway. The target gateway receives the handover request.

1505: The target gateway sends the handover request to the target base station based on the information about the target base station in the handover request. The target base station receives the handover request.

1506 is basically the same as 404.

1507: The target base station sends a handover response to the target gateway. The target gateway receives the handover response.

1508: The target gateway sends a handover response to the source gateway. The source gateway receives the handover response.

1509: The source gateway sends a handover response to the source base station. The source base station receives the handover response.

1510: The source base station sends a handover response to the terminal device. The terminal device receives the handover response.

If the handover response contains a handover instruction for a service such as a first service, steps 1511 to 1514 are correspondingly performed.

1511 is basically the same as 407.

1512: The target base station sends a handover acknowledgement to the target gateway. The target gateway receives the handover acknowledgement. The handover acknowledgement may include information about a tracking area identifier and an E-UTRAN cell global identifier (E-UTRAN Cell Global Identifier, ECGI).

1513: The target gateway sends the handover acknowledgement to the source gateway. The source gateway receives the handover acknowledgement.

1514 is basically the same as 410.

The service may be all services of the terminal device or may be some services of the terminal device. If the service is all the services of the terminal device, the foregoing method may further include steps 1515 and 1516.

1515: The source gateway sends UE context release information to the source base station. The source base station receives the UE context release information. The UE context release information is used to notify the source base station that the terminal device has been handed over to the target base station and trigger the source base station to release a resource.

1516: The source base station releases context information of the terminal device.

If ICIC needs to be performed on a service such as a second service, the handover response contains information about an air interface resource of the service, and step 1517 is correspondingly performed.

Figure 16:
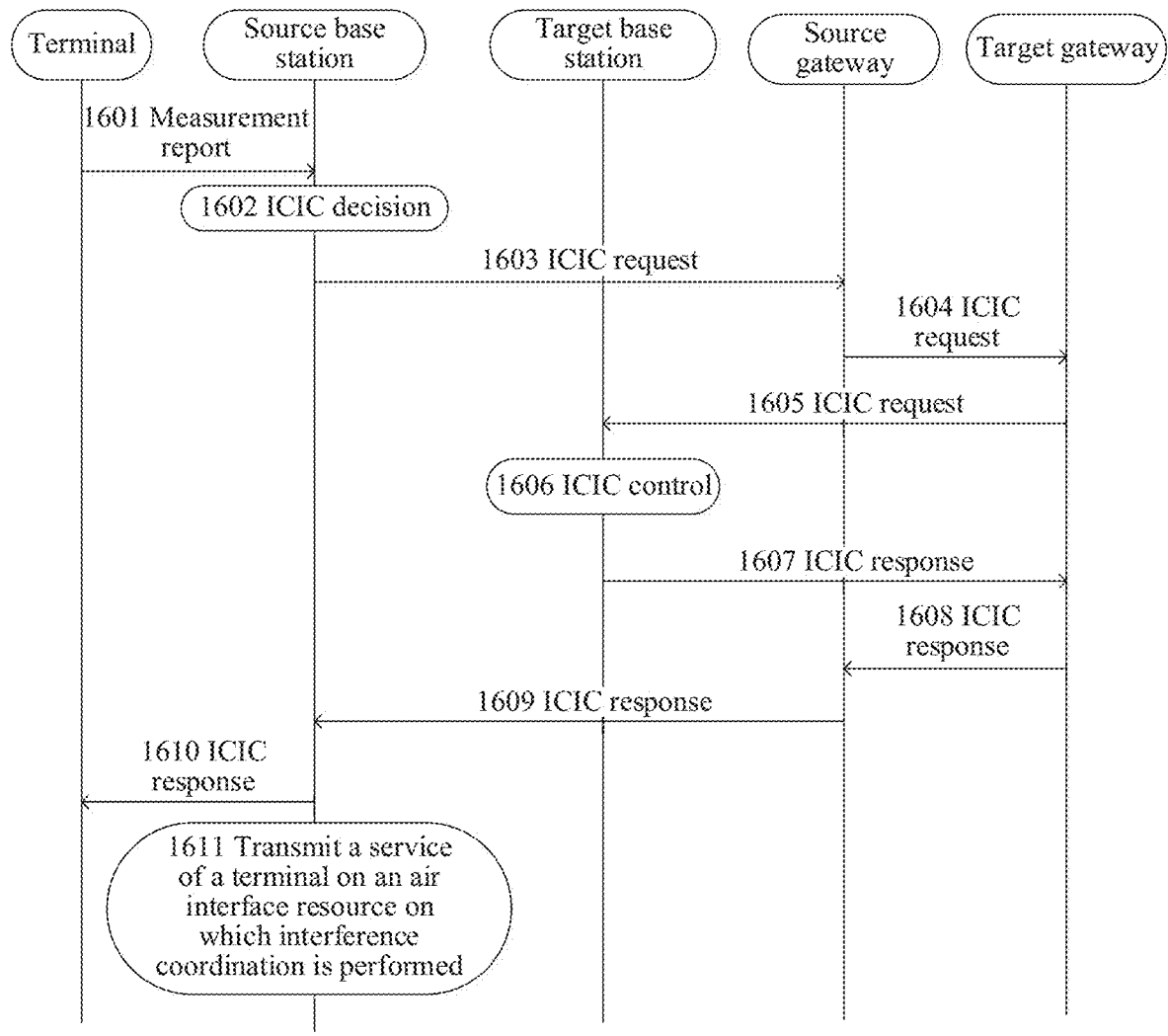
FIG. 16 is a schematic interactive diagram of an inter-cell interference coordination method according to another embodiment of the present patent application.

FIG. 16 is a schematic interactive diagram of an inter-cell interference coordination method according to another embodiment of the present patent application. An occurrence scenario of this embodiment is similar to that of the embodiment in FIG. 13. As shown in FIG. 16, the communication method includes the following steps:

1601 is basically the same as 1301.

1602 is basically the same as 1302.

1603: The source base station sends the ICIC request to a source gateway. The source gateway receives the ICIC request. Refer to step 1303 for information contained in the ICIC request. A handover request further includes a tracking area identifier used to assist the source gateway in selecting a suitable target gateway.

1604: The source gateway selects a target gateway based on the target tracking area identifier. The source gateway sends the ICIC request to the target gateway. The target gateway receives the ICIC request.

1605: The target gateway sends the ICIC request to the target base station based on information about the target base station in the ICIC request. The target base station receives the ICIC request.

1606 is basically the same as 1304.

1607: The target base station sends the ICIC response to the target gateway. The target gateway receives the ICIC response. The ICIC response includes information about an air interface resource. A handover response may further contain information of the source base station.

1608: The source gateway sends the ICIC response to the target gateway. The target gateway receives the ICIC response.

1609: The source gateway sends the ICIC response to the source base station. The source base station receives the ICIC response.

1610: The source base station sends the ICIC response to the terminal device. The terminal device receives the ICIC response.

1611: The source base station transmits a service of the terminal device on the air interface resource on which interference coordination is performed.

The solutions provided in the embodiments of the present invention are mainly described above from a perspective of interaction between network elements. It may be understood that, to implement the foregoing functions, the network elements include corresponding hardware structures and/or software modules for performing the functions. A person skilled in the art should be easily aware that, in combination with the embodiments disclosed in this specification, the present patent application can be implemented by using hardware or a combination of hardware and computer software. Whether a function is performed by hardware or by computer software driving hardware depends on particular applications and design constraint conditions of the technical solutions. A person skilled in the art may use different methods to implement the described functions for each particular application, but it should not be considered that the implementation goes beyond the scope of the present patent application.

Figure 17:
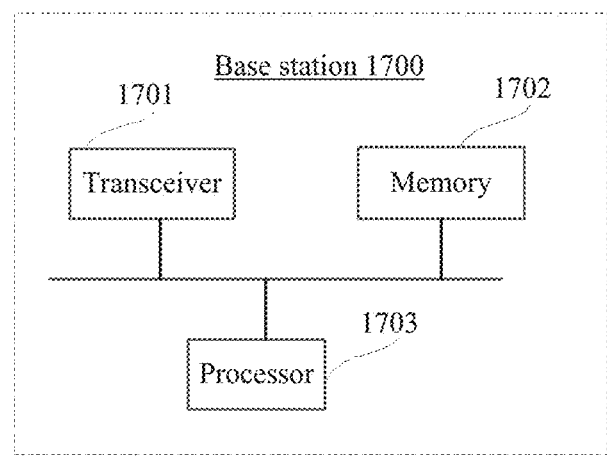
FIG. 17 is a schematic structural diagram of a base station according to another embodiment of the present patent application.

The present patent application further provides apparatus embodiments for implementing the steps and methods in the foregoing method embodiments. FIG. 17 is a possible schematic structural diagram of the base station used in the foregoing embodiments.

The base station includes: a transceiver 1701; a memory 1702, configured to store an instruction and a processor 1703, connected to the memory 1702 and the transceiver 1701, and configured to execute the instruction. The base station may be a source base station or a target base station. If the base station is a source base station, the processor performs, when executing the instruction, the foregoing steps such as receiving, sending, and obtaining of the source base station by using the transceiver 1701. The processor 1703 further performs, when executing the instruction, handover decision steps. If the base station is a target base station, the processor performs, when executing the instruction, the foregoing steps such as receiving, sending, and obtaining of the target base station by using the transceiver 1701. The processor 1703 further performs, when executing the instruction, admission control steps.

According to an embodiment, if the base station is a source base station, the processor 1703 performs the following steps when executing the instruction: instructing the transceiver 1701 to send a handover request to a target base station, where the handover request includes information about a first service of a terminal device; receiving, by using the transceiver 1701, a handover response sent by the target base station, where if the first service is supported by the target base station, the handover response includes information about a handover instruction for the first service, and the handover instruction is used to instruct the terminal device to hand over the first service to the target base station; and instructing the transceiver 1701 to send the handover response to the terminal device.

The handover request further includes information about a second service of the terminal device; and if the second service is not supported by the target base station, the handover response further includes information about an air interface resource of the second service, the air interface resource is determined by the target base station and on which interference coordination is performed, and the air interface resource is used by the source base station and the terminal device to transmit the second service.

The handover request further includes quality of service information of the second service of the terminal device, and the air interface resource is determined by the target base station based on the quality of service information.

The processor 1703 further performs the following step when executing the instruction: obtaining, by using the transceiver 1701, information about supported service of the target base station; and the sending a handover request to a target base station includes: if the target base station supports the first service, sending the handover request to the target base station.

The obtaining information about supported service of the target base station includes: receiving a measurement report sent by the terminal device, where the measurement report includes the information about the at least one supported service of the target base station.

The obtaining information about supported service of the target base station includes: receiving the information that is sent by a controller or the target base station and that is about the at least one supported service of the target base station.

The sending a handover request to a target base station includes: sending the handover request to the target base station by using the controller; and the receiving a handover response sent by the target base station includes: receiving, by using the controller, the handover response sent by the target base station.

The sending a handover request to a target base station includes: sending the handover request to the target base station by using a source gateway and a target gateway; and the receiving a handover response sent by the target base station includes: receiving, by using the source gateway and the target gateway, the handover response sent by the target base station.

According to an embodiment, if the base station is a target base station, the processor performs the following steps when executing the instruction: receiving, by using the transceiver 1701, a handover request sent by a source base station, where the handover request includes information about a first service of a terminal device; instructing the transceiver 1701 to send a handover response to the source base station, where if the base station supports the first service, the handover response includes information about a handover instruction for the first service, and the handover instruction is used to instruct the terminal device to hand over the first service from the source base station to the base station.

The handover request further includes information about a second service of the terminal device; and if the base station does not support the second service, the handover response further includes information about an air interface resource of the second service, the air interface resource is determined by the processor 1703 and on which interference coordination is performed, and the air interface resource is used by the source base station and the terminal device to transmit the second service.

The handover request further includes quality of service information of the second service of the terminal device, and the air interface resource is determined by the base station based on the quality of service information.

Figure 18:
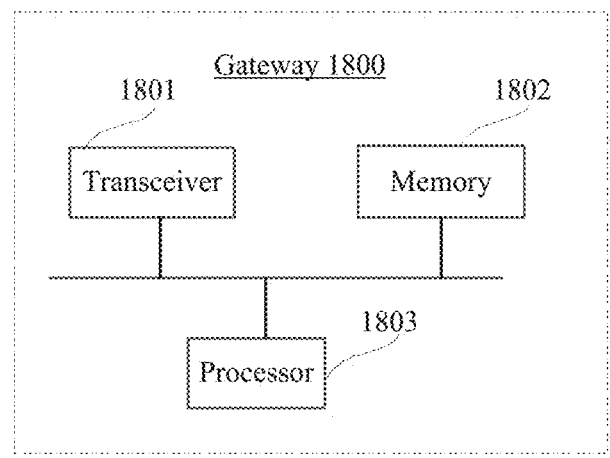
FIG. 18 is a schematic structural diagram of a gateway according to another embodiment of the present patent application.

FIG. 18 is a possible schematic structural diagram of the gateway used in the foregoing embodiments. The gateway includes: a transceiver 1801; a memory 1802, configured to store an instruction; and a processor 1803, connected to the memory 1802 and the transceiver 1801, and configured to execute the instruction. If the gateway shown in FIG. 18 is the foregoing source gateway, the processor 1803 performs, when executing the instruction, the foregoing receiving and sending steps of the source gateway by using the transceiver 1801. If the gateway shown in FIG. 18 is the foregoing target gateway, the processor 1803 performs, when executing the instruction, the foregoing receiving and sending steps of the target gateway by using the transceiver 1801. If the gateway shown in FIG. 18 is the gateway shown in FIG. 4, the processor 1803 performs, when executing the instruction, the foregoing receiving and sending steps of the gateway by using the transceiver 1801.

According to an embodiment, if the gateway is a source gateway, the processor 1803 performs the following steps when executing the instruction: receiving, by using the transceiver 1801, a handover request sent by a source base station, where the handover request includes information about a first service of a terminal device; instructing the transceiver 1801 to send the handover request to a target gateway; receiving, by using the transceiver 1801, a handover response sent by the target gateway, where if the first service is supported by a target base station, the handover response includes information about a handover instruction for the first service, and the handover instruction is used to instruct the terminal device to hand over the first service to the target base station; and sending the handover response to the source base station by using the transceiver 1801.

The handover request further includes information about a second service of the terminal device; and if the second service is not supported by the target base station, the handover response further includes information about an air interface resource of the second service, the air interface resource is determined by the target base station and on which interference coordination is performed, and the air interface resource is used by the terminal device and the source base station to transmit the second service.

The handover request further includes quality of service information of the terminal device, and the air interface resource is determined based on the quality of service information of the terminal device.

According to an embodiment, if the gateway is a target gateway, the processor performs the following steps when executing the instruction: receiving, by using the transceiver 1801, a handover request sent by a source gateway, where the handover request includes information about a first service of a terminal device; instructing the transceiver 1801 to send the handover request to a target base station; receiving, by using the transceiver 1801, a handover response sent by the target base station, where if the first service is supported by the target base station, the handover response includes information about a handover instruction for the first service, and the handover instruction is used to instruct the terminal device to hand over the first service to the target base station; and sending the handover response to the source gateway by using the transceiver 1801.

The handover request further includes information about a second service of the terminal device; and if the second service is not supported by the target base station, the handover response further includes information about an air interface resource of the second service, the air interface resource is determined by the target base station and on which interference coordination is performed, and the air interface resource is used by the terminal device and the source base station to transmit the second service.

The handover request further includes quality of service information of the terminal device, and the air interface resource is determined based on the quality of service information of the terminal device.

Figure 19:
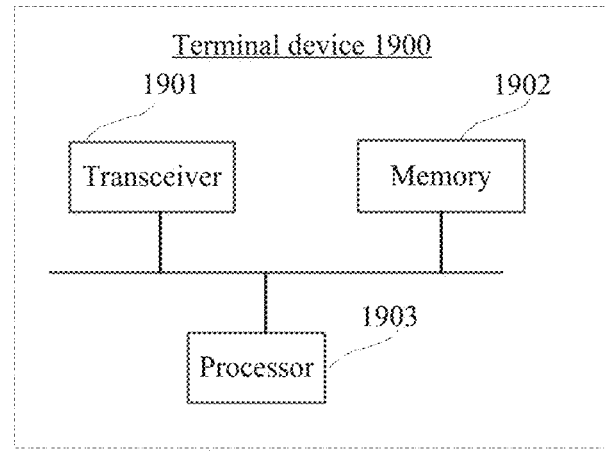
FIG. 19 is a schematic structural diagram of a terminal device according to another embodiment of the present patent application.

FIG. 19 is a possible schematic structural diagram of the terminal device used in the foregoing embodiments. The terminal device includes: a transceiver 1901; a memory 1902, configured to store an instruction; and a processor 1903, connected to the memory 1902 and the transceiver 1901, and configured to perform, when executing the instruction, the foregoing steps such as receiving and sending of the terminal device by using the transceiver 1901.

According to an embodiment, the processor 1903 performs the following steps when executing the instruction: instructing the transceiver 1901 to send a measurement report to a source base station; receiving, by using the transceiver 1901, a handover response, where if a first service of the terminal device is supported by a target base station, the handover response includes information about a handover instruction for the first service, and the handover instruction is used to instruct the terminal device to hand over the first service of the terminal device to the target base station.

If a second service of the terminal device is not supported by the target base station, the handover response further includes information about an air interface resource of the second service, the air interface resource is determined by the target base station and on which interference coordination is performed, and the air interface resource is used by the terminal device and the source base station to transmit the second service.

The measurement report includes information about supported service of the target base station.

Figure 20:
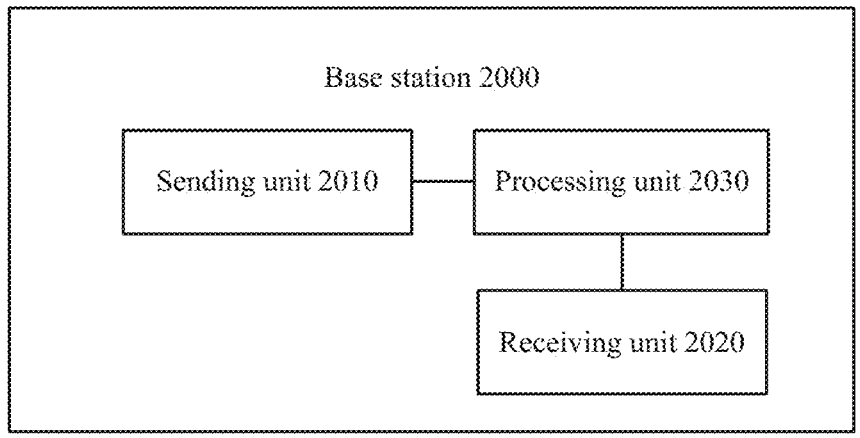
FIG. 20 is a schematic structural diagram of a base station according to another embodiment of the present patent application.

FIG. 20 is a possible schematic structural diagram of the base station used in the foregoing embodiments. As shown in FIG. 20, the base station includes a sending unit 2010 and a receiving unit 2020. The base station may be a source base station or a target base station. If the base station is a source base station, the sending unit 2010 is configured to perform the sending step of the source base station in the foregoing embodiments. The receiving unit 2020 is configured to perform the receiving step of the source base station in the foregoing embodiments. The base station may further include a processing unit, to perform the handover decision step of the source base station in the foregoing embodiments. In an optional implementation, the sending unit may be embodied as a transmitter to implement a function of the sending unit under control of a processor. The receiving unit may be embodied as a receiver to implement a function of the receiving unit under the control of the processor. The processing unit may be implemented in a form of the processor.

If the base station is a target base station, the sending unit 2010 is configured to perform the sending step of the target base station in the foregoing embodiments. The receiving unit 2020 is configured to perform the receiving step of the target base station in the foregoing embodiments. The base station may further include the processing unit to perform the admission control step of the target base station in the foregoing embodiments.

Figure 21:
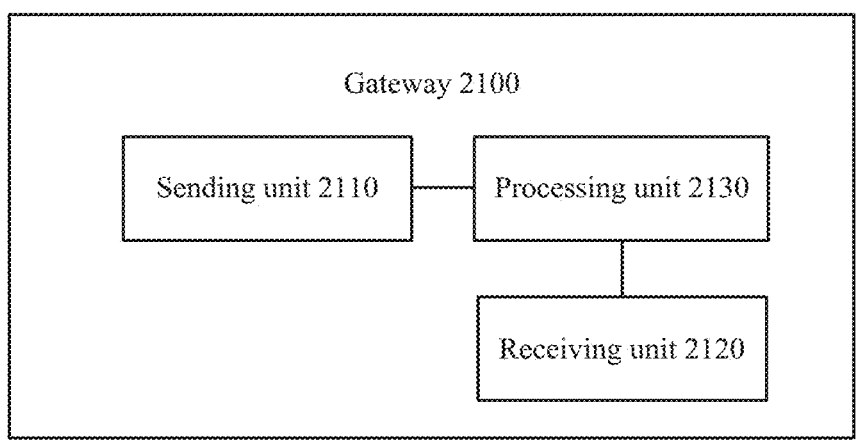
FIG. 21 is a schematic structural diagram of a gateway according to another embodiment of the present patent application.

FIG. 21 a possible schematic structural diagram of the gateway used in the foregoing embodiments. As shown in FIG. 21, the gateway includes a sending unit 2110 and a receiving unit 2121. The gateway may be a source gateway or a target gateway or the gateway in the embodiment shown in FIG. 4. If the gateway is a source gateway, the sending unit 2110 is configured to perform the sending step of the source gateway in the foregoing embodiments. The receiving unit 2121 is configured to perform the receiving step of the source gateway in the foregoing embodiments. Certainly, the gateway may further include a processing unit 2030, to complete control and processing functions. In an optional implementation, the sending unit may be embodied as a transmitter to implement a function of the sending unit under control of a processor. The receiving unit may be embodied as a receiver to implement a function of the receiving unit under the control of the processor. The processing unit may be implemented in a form of the processor.

If the gateway is a target gateway, the sending unit 2110 is configured to perform the sending step of the target gateway in the foregoing embodiments. The receiving unit 2121 is configured to perform the receiving step of the target gateway in the foregoing embodiments.

If the gateway is the gateway in the embodiment shown in FIG. 4, the sending unit 2110 is configured to perform the sending step of the gateway in the embodiment shown in FIG. 4 in the foregoing embodiments. The receiving unit 2121 is configured to perform the receiving step of the gateway in the embodiment shown in FIG. 4 in the foregoing embodiments.

Figure 22:
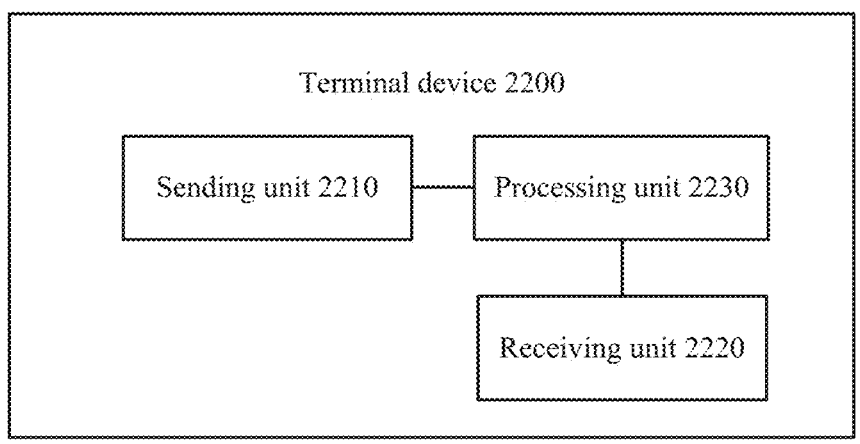
FIG. 22 is a schematic structural diagram of a terminal device according embodiment of the present patent application.

FIG. 22 is a possible schematic structural diagram of the terminal device used in the foregoing embodiments. As shown in FIG. 22, the terminal device includes a sending unit 2210 and a receiving unit 2222. The sending unit 2210 is configured to perform the sending step of the terminal device in the foregoing embodiments. The receiving unit 2222 is configured to perform the receiving step of the source terminal device in the foregoing embodiments. Certainly, the terminal device may further include a processing unit 2030, to complete control and processing functions. In an optional implementation, the sending unit may be embodied as a transmitter to implement a function of the sending unit under control of a processor. The receiving unit may be embodied as a receiver to implement a function of the receiving unit under the control of the processor. The processing unit may be implemented in a form of the processor.

It may be understood that the foregoing only shows simplified designs of network elements. In actual applications, any quantity of transmitters, receivers, processors, memories, and the like may be included.

In the present patent application, service types may be categorized with different granularities. Based on a coarse granularity, service types may be categorized into Massive M2M services, MBB services, and critical machine-to-machine communication services. Based on a relatively fine granularity, service types may be categorized into eight types, including: broadband access in dense area (Broadband access in dense area), broadband access everywhere (Broadband access everywhere), high user mobility (High user mobility), massive Internet of Things cases (Massive Internet of Things Cases), extreme real time communication (Extreme real time communication), lifeline communication (Lifeline communication), ultra-reliable communication (Ultra-reliable communication), broadcast like services (Broadcast like services). Based on a finer granularity, categorization may be performed based on different scenarios, for example, 3D conferencing.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present patent application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present patent application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present patent application essentially, or the part contributing to the prior art, or some of the technical solutions may be implemented in a form of a software product. The computer software product is stored in a storage medium, and includes several instructions for instructing a computer device which may be a personal computer, a server, a network device, or the like) to perform all or some of the steps of the methods described in the embodiments of the present patent application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present patent application, but are not intended to limit the protection scope of the present patent application. Any variation or replacement readily figured out by a person skilled in the art within the technical scope disclosed in the present patent application shall fall within the protection scope of the present patent application. Therefore, the protection scope of the present patent application shall be subject to the protection scope of the claims.

The invention claimed is:

1. A handover method, comprising:
    sending, by a source base station, a handover request to a target base station, the handover request comprising a service type of a terminal device and a quality of service (QoS) information of the terminal device, the service type corresponds to a network slice, the service type comprising at least one of a type of an ultra-low latency service, an ultra-reliable service, a massive connectivity service, a mobile broadband service, a broadband access in dense area service, a broadband access everywhere service, a high user mobility service, a lifeline communication service, or a broadcast service;
    in response to receiving the handover request, performing, by the target base station, admission control based on the service type of the terminal device and at least one service type supported by the target base station; and
    sending, by the target base station, a handover response to the source base station if the at least one service type supported by the target base station comprises the service type of the terminal device, wherein the handover response comprising information for performing a handover of the terminal device from the source base station to the target base station and a cell-radio network temporary identifier of the terminal device in the target base station.

2. The handover method according to claim 1, wherein the method further comprises:
    sending, by the target base station, the at least one service type supported by the target base station to the source base station.

3. The handover method according to claim 1, wherein the handover response further comprises a security algorithm of the target base station.

4. The handover method according to claim 1, wherein the method further comprises:
    sending, by the target base station, user equipment (UE) context release information to the source base station.

5. The handover method according to claim 1, wherein the service type of the terminal device comprises a network slice identifier.

6. The handover method according to claim 1, wherein the service type of the terminal device corresponds to a network slice identifier.

7. The handover method according to claim 1, further comprising:
    sending, by the target base station, a path switch request message.

8. The handover method according to claim 7, further comprising:
    receiving, by the target base station, a path switch request acknowledgment, wherein the path switch request acknowledgement notifies the target base station that switching of uplink and downlink paths on a core network side of the service type has completed.

9. The handover method according to claim 1, wherein the handover response further comprises a dedicated random-access preamble.

10. The handover method according to claim 1, wherein the handover response comprises information about a handover instruction for all services corresponding to all service types of the terminal device, if the target base station supports all the service types of the terminal device and the target base station has sufficient resources to support all the services corresponding to all the service types.

11. The handover method according to claim 1, wherein the handover response comprises information about handover a portion of all services corresponding to all service types of the terminal device, if the target base station has insufficient resources to support all the services corresponding to all the service types of the terminal device.

12. An apparatus comprising:
at least one processor, the at least one processor is coupled to a memory and is instructed by programming instructions stored in the memory to perform operations comprising:
receiving a handover request from a source base station, the handover request comprising a service type of a terminal device and quality of service (QoS) information of the terminal device, the service type corresponds to a network slice, the service type comprising at least one of a type of an ultra-low latency service, an ultra-reliable service, a massive connectivity service, a mobile broadband service, a broadband access in dense area service, a broadband access everywhere service, a high user mobility service, a lifeline communication service, or a broadcast service;
in response to receiving the handover request, performing admission control based on the service type of the terminal device and at least one service type supported by the base station; and
sending a handover response to the source base station if the at least one service type supported by the base station comprises the service type of the terminal device, wherein the handover response comprising information for performing a handover of the terminal device from the source base station to the base station and a cell-radio network temporary identifier of the terminal device in the base station.

13. The apparatus according to claim 12, wherein the operations further comprising:
sending the at least one service type supported by the base station to the source base station.

14. The apparatus according to claim 12, wherein the operations further comprising:
sending user equipment (UE) context release information to the source base station.

15. The apparatus according to claim 12, wherein the service type of the terminal device comprises a network slice identifier.

16. The apparatus according to claim 12, wherein the service type of the terminal device corresponds to a network slice identifier.

17. A communication system, comprising:
a source base station; and
a target base station;
the source base station is configured to:
send a handover request to the target base station, the handover request comprising information about a service a service type of a terminal device and quality of service (QoS) information of the terminal device, the service type corresponds to a network slice, the service type comprising at least one of a type of an ultra-low latency service, an ultra-reliable service, a massive connectivity service, a mobile broadband service, a broadband access in dense area service, a broadband access everywhere service, a high user mobility service, a lifeline communication service, or a broadcast service; and
the target base station is configured to:
perform admission control based on the service type of the terminal device and at least one service type supported by the target base station; and
send a handover response to the source base station if the at least one service type supported by the target base station comprises the service type of the terminal device, wherein the handover response comprising information for performing, a handover of the terminal device from the source base station to the target base station and a cell-radio network temporary identifier of the terminal device in the target base station.

18. The communication system according to claim 17, wherein the target base station is further configured to:
send the at least one service type supported by the target base station to the source base station.

19. The communication system according to claim 17, wherein the target base station is further configured to:
send a path switch request message.

20. The communication system according to claim 19, wherein the target base station is further configured to:
receive a path switch request acknowledgment, wherein the path switch request acknowledgement notifies the target base station that switching of uplink and downlink paths on a core network side of the service type has completed.

* * * * *

UNITED STATES PATENT AND TRADEMARK OFFICE
CERTIFICATE OF CORRECTION

| | |
|---|---|
| PATENT NO. | : 11,438,818 B2 |
| APPLICATION NO. | : 17/090005 |
| DATED | : September 6, 2022 |
| INVENTOR(S) | : Yinghao Jin et al. |

It is certified that error appears in the above-identified patent and that said Letters Patent is hereby corrected as shown below:

In the Claims

In Column 56, In Line 9-10, In Claim 17, delete "a service a service" and insert -- a service --.

Signed and Sealed this
Twenty-fifth Day of April, 2023

Katherine Kelly Vidal
*Director of the United States Patent and Trademark Office*